United States Patent
Nagai et al.

(10) Patent No.: US 6,353,681 B2
(45) Date of Patent: *Mar. 5, 2002

(54) COMPUTER SYSTEM FOR REALIZING CODING FUNCTION HAVING IMPROVED ERROR RESILIENCE

(75) Inventors: Takeshi Nagai, Higashi-Murayama; Kenshi Dachiku, Kawasaki; Takeshi Chujoh, Shibuya-Ku; Yoshihiro Kikuchi; Toshiaki Watanabe, both of Yokohama, all of (JP)

(73) Assignee: Kabushiki Kaisha Toshiba, Kawasaki (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 09/471,416

(22) Filed: Dec. 23, 1999

Related U.S. Application Data

(60) Continuation of application No. 09/306,983, filed on May 7, 1999, now Pat. No. 6,035,069, which is a division of application No. 08/738,171, filed on Oct. 25, 1996, now Pat. No. 5,930,395.

(30) Foreign Application Priority Data

Oct. 27, 1995 (JP) .............................................. 7-280908

(51) Int. Cl.[7] .............................. G06K 9/36; G09K 9/46
(52) U.S. Cl. ....................................... 382/232; 382/244
(58) Field of Search ................................. 382/232, 233, 382/244; 714/701, 775, 789

(56) References Cited

U.S. PATENT DOCUMENTS 5,596,421 A    1/1997    Shibata et al. .............. 348/420

OTHER PUBLICATIONS

Lin et al., "Error Control Coding: Fundamentals and Applications", Prentice–Hall, Inc., 1983, pp. 51–58.

*Primary Examiner*—Phuoc Tran
(74) *Attorney, Agent, or Firm*—Finnegan, Henderson, Farabow, Garrett & Dunner, L.L.P.

(57) ABSTRACT

An input image signal is coded by an encoder to be outputted as a basic code string, and the basic code string is delayed by a code-string delay circuit for a predetermined period of time to be outputted as an additional code string. The basic code string is synthesized with the additional code string by a code-string synthesizer to be outputted as an output code string. Thus, there is provided an image data coding system which can quickly restore data even if the data is lost due to error and in which the increased code amount is less than the cycle refresh and the error correction.

16 Claims, 21 Drawing Sheets

: COEFFICIENT INCORPORATED IN ADDITIONAL CODE-STRING

COMPUTER SYSTEM FOR REALIZING CODING FUNCTION HAVING IMPROVED ERROR RESILIENCE

This is a continuation of application Ser. No. 09/306,983, filed May 7, 1999, now U.S. Pat. No. 6,035,069, which is a divisional of Ser. No. 08/738,171 filed Oct. 25, 1996 now U.S. Pat. No. 5,930,395 issued Jul. 27, 1999, all of which are incorporated herein by reference.

BACKGROUND OF THE INVENTION

The present invention relates to an image data coding and/or decoding system for compressing and coding an image data into a smaller amount of data and for decoding code strings obtained by the compression coding to reproduce an image. More specifically, the invention relates to an image data coding and/or decoding system which has high error resilience and which can transmit and/or store a coded image date of high quality even if the coded image data is transmitted and/or stored via a medium wherein an error easily occurs, such as a radio channel.

In an image transmitting and/or storing system such as a video telephone, a videoconferencing system, a portable information terminal, a digital video disc system and a television broadcasting system, various systems, which include the motion compensation, the discrete cosine transform, the sub-band coding, the pyramid coding and the combinations thereof, have been developed as techniques for compressing and coding an image data into a smaller amount of data for transmission/storing. In addition, as international standard methods for compressing and coding a moving picture, the methods "ISO•MPEG1", "ISO•MPEG2", "ITU-T•H.261", and "ITU-T•H.262" are standardized. All these methods are compressing and coding methods, each comprising a combination of the motion-compensated adaptive prediction and the discrete cosine transform, and described in detail in "International Standard of Multimedia Coding" (edited and written by Hiroshi Yasuda, published by Maruzen, June 1991) (Literature 1) and so forth.

As an example of conventional moving-picture coding systems, the basic construction of a coding system using the motion-compensated adaptive prediction and the discrete cosine transform is shown in FIG. 1. In this figure, after an input image signal S1 is divided into a plurality of regions defined by a region divider 1, the motion-compensated adaptive prediction is carried out. That is, a motion-compensated adaptive predictor 2 detects a motion vector between the input image signal S1 and a reference image signal S2 of the previous frame, which is stored in a frame memory 3 and which has been already coded and locally decoded, and performs the motion compensation with respect to the reference image signal using the detected motion vector, so, as to produce a prediction signal. However, in the motion-compensated adaptive predictor 2, a preferred prediction mode is selected from intraframe codings (prediction signal=0) directly using the motion compensated prediction and the input image signal S1, and the prediction signal S3 corresponding to the prediction mode is outputted.

Then, in a subtracter 4, the prediction signal S3 is subtracted from the input image signal S1 to output a predictive residual signal S4. With respect to each of blocks of a predetermined size, the discrete cosine transform (DCT) of the predictive residual signal S4 is carried out by means of a discrete cosine transformer 5. The DCT coefficient obtained by the discrete cosine transform is quantized by means of a quantizer 6. The DCT coefficient quantized by the quantizer 6 is divided into two portions. One of the two portions is coded by means of a variable-length encoder 7, and then, it is multiplexed with the motion vector, which has been coded by a variable-length encoder 9, by means of a multiplexer 8 to be outputted as a bit-stream. The other portion is inverse-quantized by means of a inverse quantizer 10, and then, the inverse discrete-cosine transform (inverse DCT) thereof is carried out by means of an inverse discrete-cosine transformer 11. The output of the inverse discrete-cosine transformer 11 is added to the adaptive prediction signal S3 by means of an adder 12 to be a locally decoded signal to be stored in the frame memory 3.

FIG. 2 is a view illustrating the basic construction of a moving-picture decoding system which corresponds to the moving-picture coding system of FIG. 1. The code string transmitted from the moving-picture coding system to be stored is divided into a quantized DCT coefficient and a motion vector data by means of a demultiplexer 13. The quantized DCT coefficient data passes through a variable-length decoder 14, a inverse quantizer 15 and a inverse discrete-cosine transformer 16, to be outputted as a predicted error signal S6. The motion vector data is decoded by means of a variable-length decoder 17, and then, it is inputted to a motion-compensation predictor 18. In the motion-compensation predictor 18, the motion compensation to a reference image signal S7 of the last frame in a frame memory 19 is carried out using the motion vector to produce a prediction signal S8. Then, in an adder 20, the predicted error signal S6 is added to the prediction signal SS to reproduce an image signal S9. The reproduced image signal S9 is outputted to the outside of the system and stored in the frame memory 19 as the reference image signal S7.

However, in such a conventional moving-picture coding and/or decoding system, there are the following problems.

In a channel in which an error may be mixed, such as a radio channel, when only the aforementioned coding is carried out, the quality of the decoded image is remarkably deteriorated if an error occurs. In particular, when there is an error in a signal such as a synchronizing signal, a mode data and a motion vector, the picture quality is remarkably deteriorated.

In addition, as mentioned above, the motion-compensated adaptive prediction coding is frequently used in the moving picture coding. However, since only the interframe difference is coded in the motion-compensated adaptive prediction coding, when an error occurs, the frame is not only incorrect, but an incorrect image is also stored in a frame memory, so that a predicted image is prepared using the incorrect image and a residual error is added thereto. For that reason, even if the subsequent frame is correctly decoded, it is not possible to obtain a correctly decoded image in the subsequent frame, except that when the data is transmitted in a mode (INTRA mode) wherein the coding is performed in only the frame without using the interframe difference or when the influence of the error is gradually attenuated to return to the original state.

FIG. 3 illustrates this condition. This example shows the condition that a black circle is moving. Signals including a residual signal representative of a circle of the next frame (expressed by the black circle of the residual signal) and a residual signal for erasing a circle of the last frame (expressed by a dotted-line circle of the residual signal) are outputted as interframe differential signals. In this case, the motion compensation is not performed for simplification, and the interframe difference is obtained assuming that MV (motion vector)=0.

If data of one frame is lost due to error, the second frame is not decoded at all, and for example, the first frame is outputted as it is. In the third frame, a residual error, which is capable of correctly decoding if it is added to the second frame, is added to the first frame to reproduce a quite different image. Thereafter, since the residual error is added to the incorrect image, the error is not basically erased, so that it is not possible to reproduce a correctly decoded image.

In order to eliminate the aforementioned problem, a method called "refresh" for coding in the INTRA mode every a predetermined cycle has been conventionally used. In this case, when the coding is performed in the INTRA mode, the code amount is increased to remarkably deteriorate the picture quality when no error occurs. Therefore, methods such as the cyclic refresh for refreshing every few macroblocks in one frame, not simultaneously refreshing the whole picture, are generally used. However, although the cyclic refresh is able to resstring the increase of the code string, there is a problem in that it takes a long time until the normal state is restored.

As other measures against errors, there is the use of the error correction coding. The error correction coding is able to correct errors caused at random. However, if errors of hundreds bits occur at a burst and continuously, it is difficult to correct such errors. Even if it is possible to correct such errors, a very long redundancy is required.

As mentioned above, in an image coding, particularly in a moving-picture coding, the loss of data due to error greatly deteriorates the picture quality. In addition, in the conventional methods such as the cyclic refresh for restoring the lost data due to error, there are problems in that it takes a long time until it is restored considering the coding efficiency, and that the attempt to decrease the time required to restore the lost data increases the code amount to lower the efficiency.

SUMMARY OF THE INVENTION

It is therefore an object of the present invention to provide a moving-picture coding and/or decoding system which can quickly restore if data is lost due to error and in which the increased code amount is less than those of the refresh and the error correction.

In order to accomplish the aforementioned and other objects, according to one aspect of the present invention, a moving-picture decoding system comprises: coding means for coding an input image signal to output a basic code string; code-string delay means for delaying the basic code string for a predetermined period of time to output as an additional code string; and code-string combining means for combining the basic code string with the additional code string to output the synthesized code string.

According to another aspect of the present invention, a moving-picture decoding system corresponding to the aforementioned moving-picture coding system, comprises: code-string dividing means for dividing an input code string into a basic code string and an additional code string obtained by delaying the basic code string; decoding means for decoding the basic code string or the additional code string to output a decoded data; error discriminating means for discriminating whether it is possible to decode the basic code string from the decoded data by the decoding means; and code-string switching means for inputting the basic code string to the decoding means when it is discriminated by the discriminating means that it is possible to decode the basic code string by the decoding means, and for inputting the additional code string to the decoding means when it is discriminated by the discriminating means that it is impossible to decode the basic code string by the decoding means.

Thus, according to the present invention, after the code string obtained by coding the input image signal is outputted as the basic code string, the additional code string which is basically the same as the basic code string is outputted again after a predetermined period of time. Therefore, even if the first outputted data of the basic code string is destroyed due to error during the transmission/storing, it is compensated by the data of the additional outputted after a predetermined period of time, so that the decoding is correctly performed.

In addition, according to the present invention, an additional code string simplified by selecting only important data and so forth may be outputted to reduce the code amount, in place of the directly outputting of the same additional code string as the first outputted basic code string. The image data decoding system includes interpolating means for interpolating the parts of the additional code string simplified to reduce the code amount, and decodes the additional code string after the interpolation when it is discriminated that it is impossible to decode the basic code string. Thus, it is possible to improve the error resilience without remarkably deteriorating the decoded image when no error occurs. Moreover, according to the present invention, a synchronizing signal may be added to the additional code string in the moving-picture coding system so as to form one frame by only the additional code string. In this case, the moving-picture decoding system discriminates the basic code string from the additional code string by the synchronizing signal added to the additional code string, and divides the input code string into the basic code string and the additional code string on the basis of the discriminated results. Thus, since the moving-picture decoding system can discriminate the basic code string from the additional code string by only detecting the synchronizing signal, its construction is simple. In addition, if the synchronizing signal is thus added to the additional code string, the total number of the synchronizing signals increases, so that the opportunity for restoring the synchronism increases.

As mentioned above, according to the present invention, it is possible to provide a moving-picture coding and/or decoding system, which can quickly restore if data is lost due to error caused during the transmission/storing, in which the deterioration of quality of the decoded image is small, in which the increase of the code amount is smaller than those in the cyclic refresh and the error correction which have been conventionally performed as the measures against errors, and which has a high coding efficiency.

That is, according to the present invention, after a code string produced by coding an input image signal is outputted as a basic code string, an additional code string having basically the same contents is outputted again after a predetermined period of time, so that it is possible to perform the correct decoding using the data of the additional code string even if the data of the basic code string is destroyed due to errors caused during the transmission/storing.

In addition, if an additional code string simplified by selecting only important data from the basic code string and so forth to reduce the code amount, is outputted as the additional code string to interpolate the simplified parts of the additional code string on the decoding side for decoding, it is possible to further improve the error resilience without remarkably deteriorating the quality of the decoded image when no error occurs.

Moreover, a synchronizing signal may be added to the additional code string to form one frame by only the additional code string, so that the basic code string may be discriminated from the additional code string by the synchronizing signal added to the additional code string on the decoding side so as to divide the input code string into the basic code string and the additional code string. Thus, the construction is simple and the total number of the synchronizing signals increases, so that the opportunity for restoring the synchronism. Therefore, it is possible to further improve the error resilience.

DESCRIPTION OF THE PREFERRED EMBODIMENTS

Figure 1:
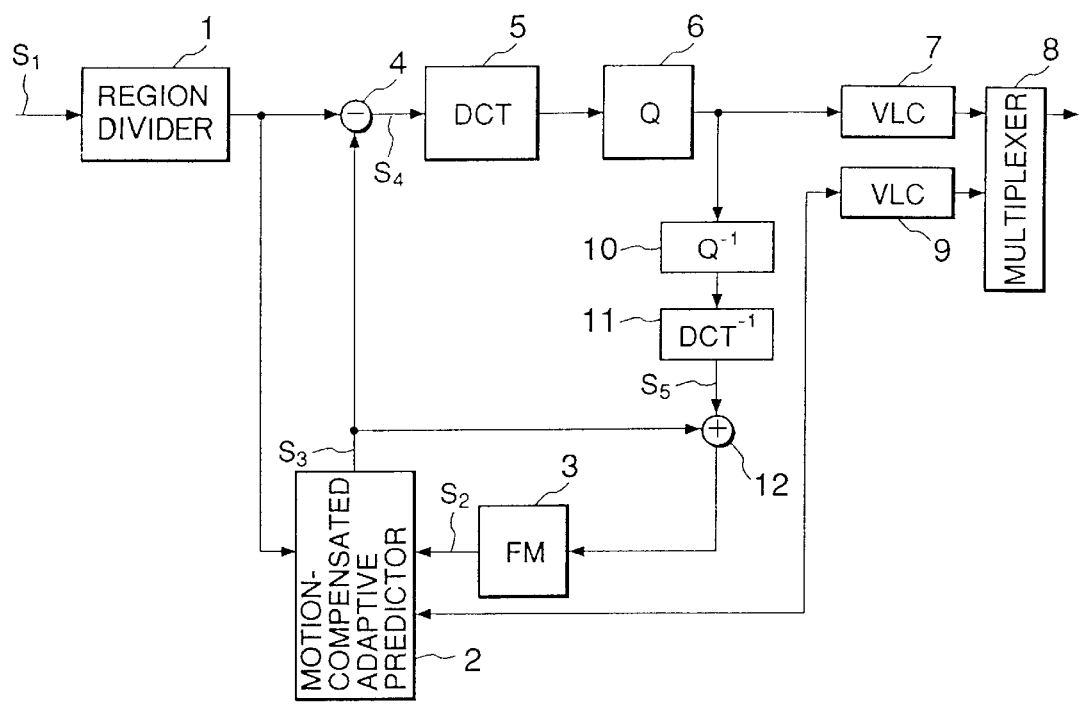
FIG. 1 is a block diagram of a conventional moving-picture coding system.

Referring now to the drawings, the preferred embodiments of the present invention will be described below.

Figure 4:
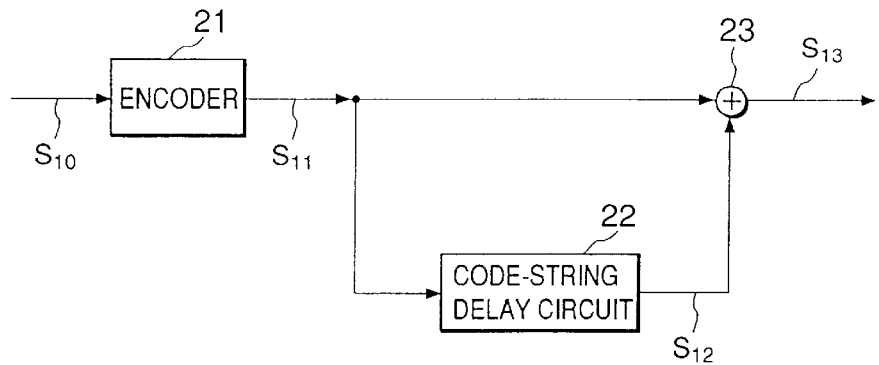
FIG. 4 is a block diagram of the first preferred embodiment of a moving-picture coding system according to the present invention.

FIG. 4 is a block diagram of the first preferred embodiment of a moving-picture coding system according to the present invention. An input image signal S10 is coded in an encoder 21 to be outputted as a code string (which will be hereinafter referred to as a "basic code string"). The basic code string S11 is directly inputted to a code-string synthesizer 23. The basic code string S11 is also inputted to a code-string delay circuit 22 wherein it is stored and retained for a predetermined period of time, and then it is outputted.

That is, the code-string delay circuit 22 outputs the retained past code string (which will be hereinafter referred to as an "additional code string") S12 after the predetermined period of time. This additional code string S12 is also inputted to the code-string synthesizer 23. In the code-string synthesizer 23, the basic code string S11 outputted from the encoder 21 is synthesized with the additional code string S12 outputted from the code-string delay circuit 22, to be outputted as an output code string S13.

Figure 5:
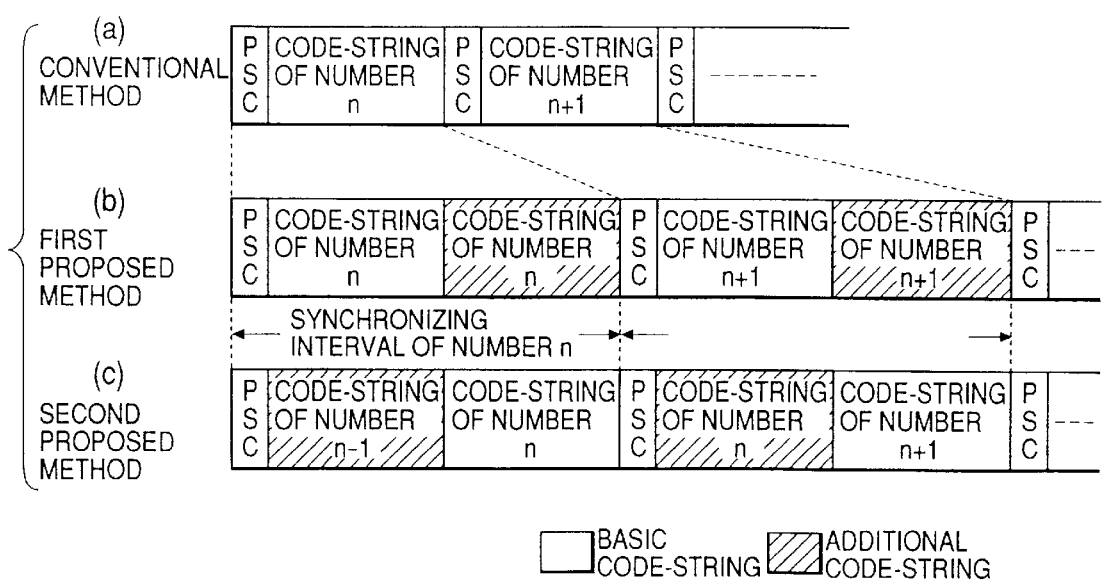
FIG. 5 is a view illustrating a construction of code strings in the first preferred embodiment.

FIG. 5 is a view illustrating the constructions of an output code string (a) in a conventional system and output code strings (b) and (c) in the preferred embodiment of the present invention. Although there are various methods for combining code strings in the code-string synthesizer 23, two types of methods are shown herein as examples. Furthermore, the PSC (Picture Synchronization Code) denotes a synchronizing signal in the figure.

The first proposed method shown in FIG. 5 is a method wherein immediately after the basic code string S11 outputted without passing through the code-string delay circuit 22, the additional code string S12, which is outputted from the code-string delay circuit 22 and which is the same as the basic code string S11, is outputted again. In this first proposed method, one frame includes two data of the same code string. Therefore, even if an error occurs in one of the code string data, it is possible to correctly code on the decoding side by using the other code string data.

However, if a variable-length code is used in the code string, once an error occurs, the pause between codes can not be found out, so that the step-out which can not correctly decode may occur. Therefore, if the first proposed method is used in a system utilizing a variable-length code, when an error occurs in the head basic code string, the subsequent additional code string can not be correctly decoded. Accordingly, this method can be effectively used in a system using a fixed-length code or when the construction of code string which can be decoded in the inverse direction is used.

In addition, since the two same code strings are arranged, the respective code strings can be divided by deriving the bit number in one synchronizing interval (from a synchronizing signal to the adjacent synchronizing signal) to divide it into two equal parts. However, it is required to take notice that when the synchronizing signal is lost or when a false synchronizing signal occurs, the code amount in a correct synchronizing interval can not be derived so as to cause malfunction.

The second proposed method shown in FIG. 5(c) is a method which can be utilized even if a usual variable-length code is used. In this method, a code string obtained by coding the frame of number n in the input image signal is used as a basic code string, and a code string obtained by coding the frame of number n−1 in the input image signal is used as an additional code string, so that these code strings are synthesized in one frame. Unlike the aforementioned first proposed method, in this method, the code string obtained by coding the frame of number n is outputted again as the additional code string in the synchronizing interval of number n+1. Therefore, even if the data wherein an error occurs is lost in the synchronizing interval of number n, the same data exists in the next synchronizing interval of number n+1, so that it can be used to correctly decode.

In this second proposed method, the second code string is synthesized in the next synchronizing interval. Therefore, even if an error occurs, there is no influence of the error unless the next synchronizing signal is destroyed, so that it is not particularly required to consider the problem with respect to the step-out of the variable-length code, such as the problem caused in the first proposed method. However, when an error occurs, the decoding can not correctly performed unless the signal in the next synchronizing interval is decoded. Therefore, in some methods for constructing a decoder, the timing for outputting the decoded image signal may be delayed in comparison with the original timing.

The first preferred embodiment of an image data decoding system according to the present invention will be described below.

Figure 6:
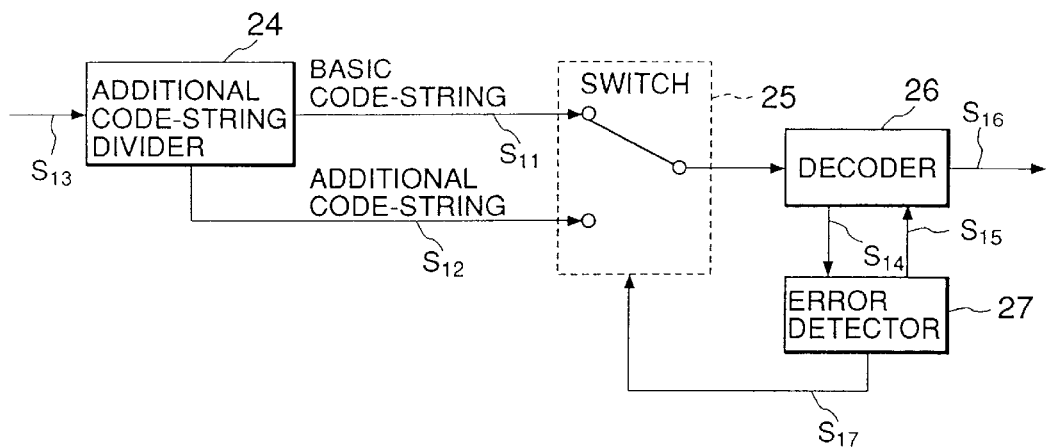
FIG. 6 is a block diagram of the first preferred embodiment of a moving-picture decoding system according to the present invention.

FIG. 6 is a block diagram of the first preferred embodiment of an image data decoding system according to the present invention, which corresponds to the image data coding system shown in FIG. 4. An input code string S13, which is outputted from the image data coding system of FIG. 4 and which is inputted via a transmitting system or a storing system (not shown), is divided into a basic code string S11 and an additional code string S12 by means of an additional code-string divider 24. Typically, the basic code string S11 is selected by a switch 25 to be inputted to a decoder 26.

The decoder 26 decodes the basic code string S11 and outputs a decoded-state indicative signal S14, which is representative of the decoded state of the basic code string S11, to an error detector 27. The error detector 27 determines whether there is no error in the input code string S13 and the decoded results of the decoder 26 on the basis of the decoded-state indicative signal S14, and outputs an error detection signal S15, which is representative of the presence of error, to the decoder 26. When the error detection signal S15 indicates that there is no error, the decoder 26 outputs the decoded results of the basic code string S11 as a decoded image signal S16, and when it indicates that there is an error, the decoder 26 does not output the decoded results.

In addition, the error detector 27 outputs a switch control signal S17 to the switch 25 so that when there is an error, the switch 25 is changed over to select the additional code string S12 so as to input the additional code string S12 to the decoder 26. In this case, the decoder 26 decodes the additional code string S12, and when the error detector 27 detects no error, the detector 26 outputs the decoded results thereof as the decoded image signal S16 in place of the decoded results of the basic code string S11.

Furthermore, when there are errors in both of the basic code string S11 and the additional code string S12, the decoder 26 may directly output the last frame.

Another preferred embodiment of the present invention will be described below. Furthermore, in this preferred embodiment and other preferred embodiments after this preferred embodiment, the blocks defined by the same names as those in FIGS. 4 and 6, which disclose the first preferred embodiment, have the same functions as those in the first preferred embodiment.

Figure 7:
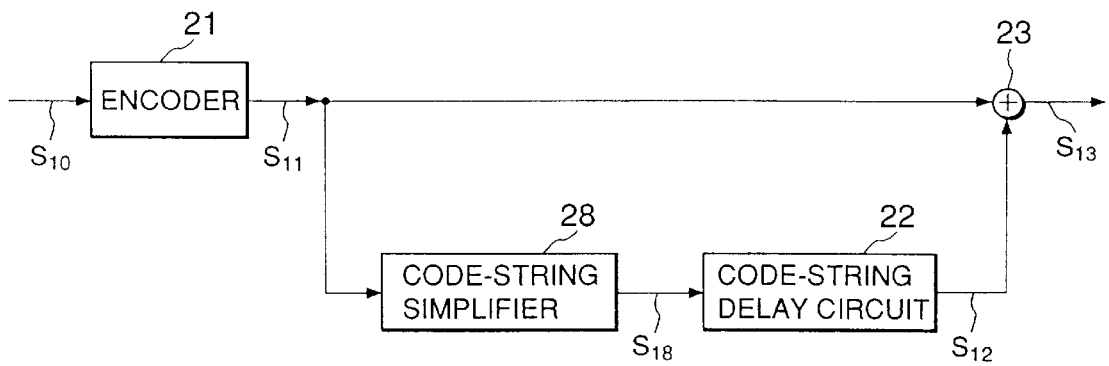
FIG. 7 is a block diagram of the second preferred embodiment of a moving-picture coding system according to the present invention.

FIG. 7 is a block diagram of the second preferred embodiment of an image data coding system according to the present invention. This system is the same as that in the first preferred embodiment, except that an input image signal S10 is coded by means of an encoder 21, and the resulting basic code string S11 is transformed into a simplified code string S16 in order to reduce the code amount thereof, and then, the simplified code string S18 is inputted to a code-string delay circuit 22. The simplified code string S18 is delayed for a predetermined period of time by means of the code-string delay circuit 22 to be outputted as an additional code string S12. The additional code string S12 is synthesized with the basic code string S11 to be outputted as an output code string S13.

A code-string simplifier 28 is provided for reducing the code amount of the additional code string S12. Therefore, although the code-string simplifier 28 is arranged upstream of the code-string delay circuit 22 in FIG. 7, it may be arranged downstream of the code-string delay circuit 22.

According to this preferred embodiment, since the code amount of the additional code string S12 is less than that of the basic code string S11, it is possible to realize the same amount of error resilience as that in the first preferred embodiment, by a smaller increase of code amount than those in conventional methods. In addition, since the increase of the code amount is small, when there is a smaller error than that in the first preferred embodiment, it is possible to obtain a decoded image of better quality.

On the other hand, if the basic code string S11 is destroyed when an error occurs and if the decoding is performed by the additional code string S12, the decoded results may remain having distortion to some extent since the additional code string is simplified to reduce the amount of data. However, if the method for simplifying the code string is devised, it is possible to decrease the distortion so that there is visually no problem. Embodiments of the simplifying methods will be described below.

The first simplifying method is a method wherein only important data is selected from the basic code string S11 (coding data). As mentioned above, the basic code string S11 comprises signals of various characteristics, which include mode data, a motion vector and a predictive residual signal. The code-string simplifier 28 selects only more important signals from the signals forming the basic code string S11 to output the selected signals as the simplified code string S18, and the code-string delay circuit 22 delays the simplified code string S18 to output the additional code string S12.

Figure 8:
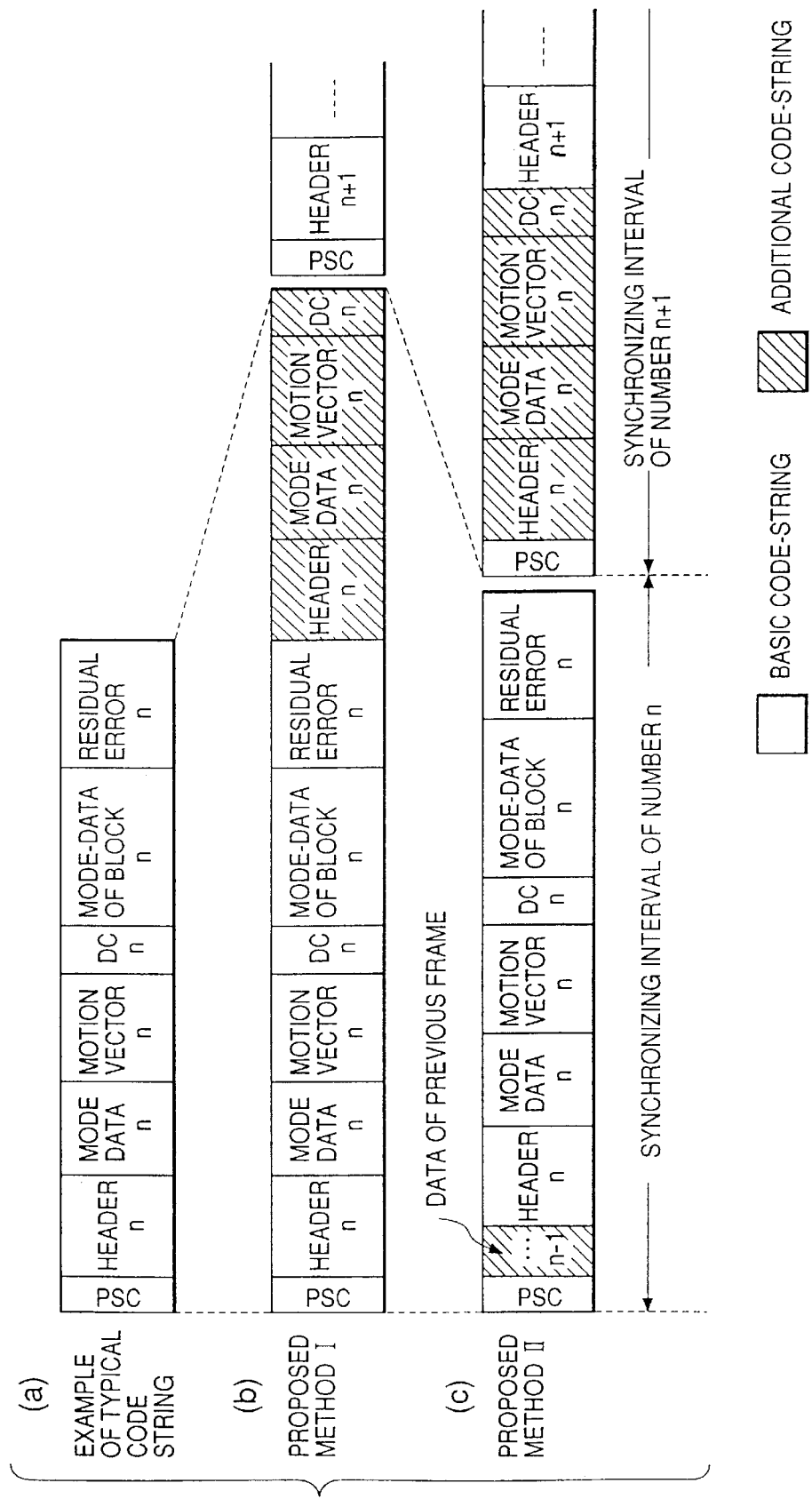
FIG. 8 is a view illustrating a construction of code strings in the second preferred embodiment.

For example, an example of a typical code string as shown in FIG. 8(a) will be considered. As described in FIGS. 1 and 2, in the case of a moving-picture coding and/or decoding system using the motion-compensated adaptive prediction coding, a prediction signal is prepared by the motion compensation in a first step, and a predictive residual signal is added to the prediction signal in the next step. In this case, since the decoding system can obtain a decoded image signal of a certain level if the signals up to the prediction signals are prepared, it is limited to only the data, by which the prediction signal can be prepared by the motion compensation, to form the simplified code string S18, i.e. the additional code string S12. In addition, since the block of INTRA mode can be expressed by the prediction signal, the DC component of the block of INTRA mode is added to the additional code string S12 so as to correspond to the INTRA mode. Thus, the additional code string S12 is formed to be synthesized with the basic code string S11, so that it is possible to effectively enhance the error resilience.

FIGS. 8(b) and 8(c) illustrate proposed methods I and II which use code strings corresponding to those in the first and second proposed methods shown in FIGS. 5(b) and 5(c) in the first preferred embodiment. In the figures, the signs n−1, n and n+1 described at the lower-right of the respective blocks indicate what number of frame the data of the block belongs to.

Figure 9:
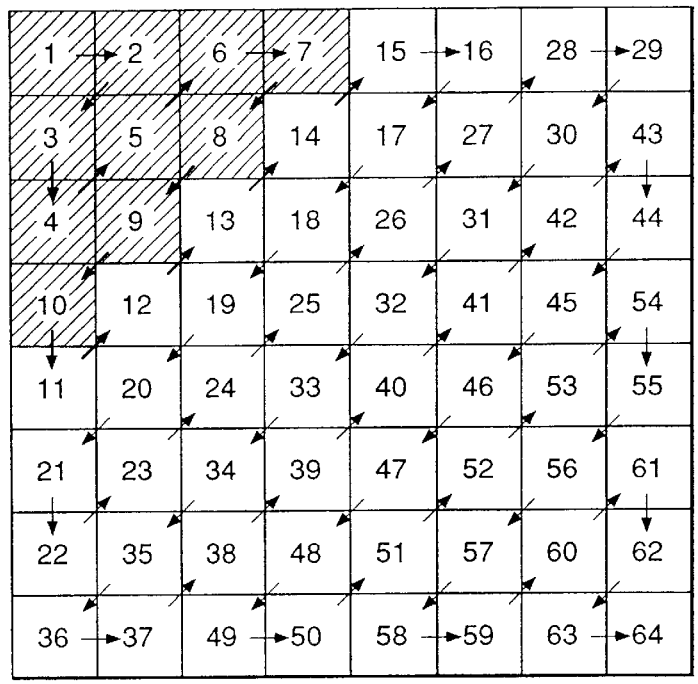
FIG. 9 is a view illustrating an example of a method for selecting a band of a predictive residual signal in the second preferred embodiment.
Figure 9:

The second simplifying method will be described below. The aforementioned first simplifying method is effective when coding at a low bit rate. However, in the case of a high bit rate, if only the prediction signal is reproduced, it is often greatly different from the original image. Therefore, it is also required to incorporate the predictive residual signal of a certain extent into the additional code string S12. In this case, it is possible to resstring the increase of the code amount by selecting only blocks having predictive residual signals of high level or by selecting and outputting components near the low region of the DCT coefficient obtained by the discrete cosine transform, i.e. components corresponding to the coefficient expressed by the slanting lines in FIG. 9, which indicate the DCT coefficient.

In the second simplifying method as set forth above, the code amount may not be sufficiently reduced to a target amount by simply selecting the signal. As a method for dealing with such a case, the third simplifying method will be described. Although the simplified code string S18 is directly outputted after the signal is selected in the aforementioned methods, the simplified code string S18 is outputted after the accuracy is lowered in the third simplifying method. For example, the motion vector of a half picture element (pixel) unit is requantized into a motion vector of an integral pixel unit which is outputted as the simplified code string S18.

In addition, the predictive residual signal outputted as the simplified code string S18 is requantized using a greater quantization width than a typical quantization width, so that it is possible to decrease the code amount in comparison with the first and second simplifying methods. The accuracy of requantization is good when the quantization is performed using a new great quantization width obtained by returning to the discretecosine-transformed coefficient level and the motion compensation. However, since such processing takes a lot of time, a method for further quantizing by reducing the quantized value to half and so forth may be used.

Figure 10:
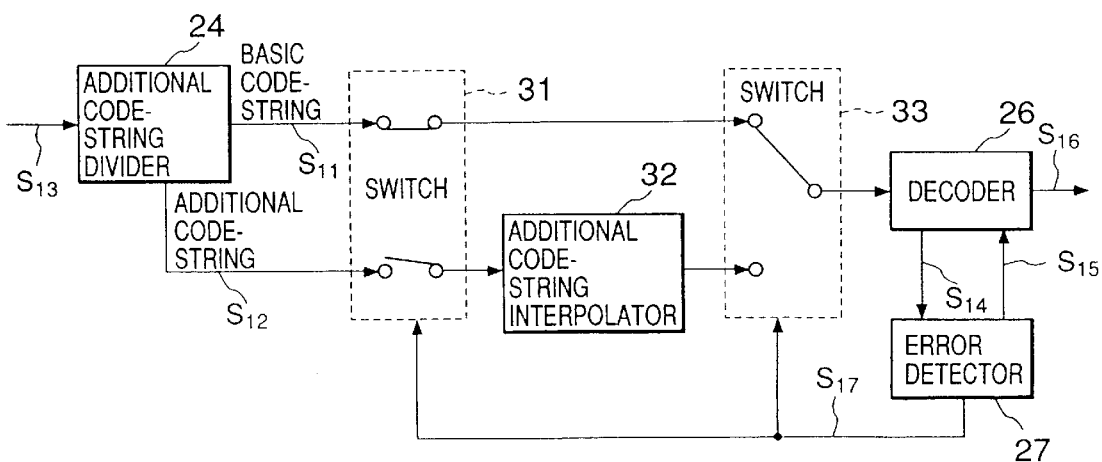
FIG. 10 is a block diagram of the second preferred embodiment of a moving-picture decoding system according to the present invention.

The second preferred embodiment of an image data decoding system according to the present invention will be described below. FIG. 10 is a block diagram of the second preferred embodiment of an image data decoding system according to the present invention, which corresponds to the image data coding system shown in FIG. 7. Since the basic operations of the respective sections are the same as those of the image data decoding system in the first preferred embodiment shown in FIG. 6, only the different points will be described below.

The decoding system in this preferred embodiment is substantially the same as that in the first preferred embodiment, except that a first switch 31 is changed over to an additional code string S12 by means of a switch control signal S17 inputted from an error detector 27 on the basis of a decoded state indicative signal S14 inputted from a decoder 26 when an error occurs, and thereafter, the additional code string S12 is temporally inputted to an additional code-string interpolator 32, not directly inputted to the decoder 26. The additional code-string interpolator 32 adds lack data to the additional code string S12 and restores data deformed by requantization and so forth so that the additional code string S12 simplified by the aforementioned first through third simplifying methods can be decoded by the decoder 26.

If the image data coding system has the code-string construction which permits the direct input into the decoder 32, it is not required to provide the additional code-string interpolator 32, so that the decoding can be performed by the same image data decoding system as that in the first preferred embodiment shown in FIG. 6. For example, when the predictive residual signal is omitted, the mode data may be rewritten to be preset to a mode having no prediction residual error to form an additional code string.

In addition, when the additional code string S12 is simplified, if the basic code string is replaced by only the additional code string in the image data decoding system, the quality of the decoded image is deteriorated by the simplified parts in comparison with the quality of the decoded image when no error occurs. Therefore, similar to the image data decoding system in the first preferred embodiment, when the basic code string is inputted to the decoder 26 via the second switch 33 to be decoded, the correctly decoded signal is directly outputted as the decoded image signal S16, and the signal in which the additional code string is decoded with respect to only the lack data due to error is outputted as the decoded image signal S16. Thus, it is possible to resstring the influence of the lack data by simplifying the additional code string.

Figure 11:
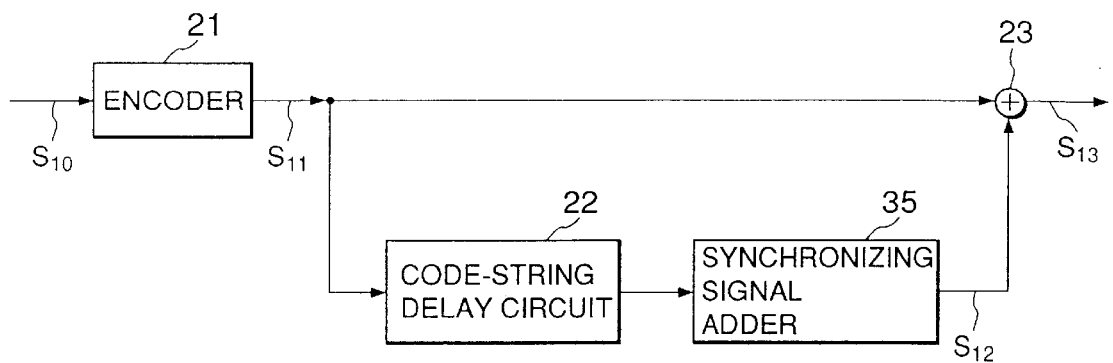
FIG. 11 is a block diagram of the third preferred embodiment of a moving-picture coding system according to the present invention.

FIG. 11 is a block diagram of the third preferred embodiment of an image data coding system according to the present invention. The feature of this preferred embodiment is that a synchronizing signal adder 35 is newly added. In this embodiment, although the synchronizing signal adder 35 is added to the image data coding system in the first preferred embodiment shown in FIG. 4, it may be added to the system in the second preferred embodiment shown in FIG. 7.

This system is different from the first and second preferred embodiments at the point that when an additional code string S12 is outputted through a code-string delay circuit 22, a synchronizing signal is added to the additional code string S12 in the synchronizing signal adder 35. The advantage of this system is that since one synchronizing interval is formed by the additional code string S12 by adding the synchronizing signal, the additional code string S12 is independent of a basic code string S11, and errors occurring in other synchronizing intervals have no influence upon the additional code string S12. In addition, since the error occurring in the additional code string S12 is closed therein, it has no influence upon the other synchronizing intervals. Therefore, there is a smaller influence of error than the first and second preferred embodiments, so that it is possible to further enhance the error resilience.

In addition, when the additional code string is divided by the image data decoding system, the processing can be performed for each of synchronizing intervals, so that the division can be easily performed. However, it is required to use an additional data for discriminating whether the read data in a synchronizing interval corresponds to a basic code string or an additional code string. As such discriminating methods, two methods will be described below.

A first discriminating method is a method for discriminating whether it corresponds to a basic code string or an additional code string by means of synchronizing signals. That is, it is determined by preparing different synchronizing signals for the basic code string and the additional code string to put each synchronizing signal to its proper use. A second discriminating method is a method for using the same synchronizing signal for a basic code string and an additional code string to discriminate whether it corresponds to the basic code string or the additional code string on the basis of the subsequent header information.

Comparing the first and second discriminating methods, although it is better to prepare two different synchronizing signals as the first discriminating method from the standpoint of efficiency of the coding, it is required to select a synchronizing signal which is quite different from those of the other codes. Thus, it is possible to more easily realize the second discriminating method which does not newly prepare another synchronizing signal and which has one synchronizing signal to perform the discrimination by the subsequent header information.

Figure 12:
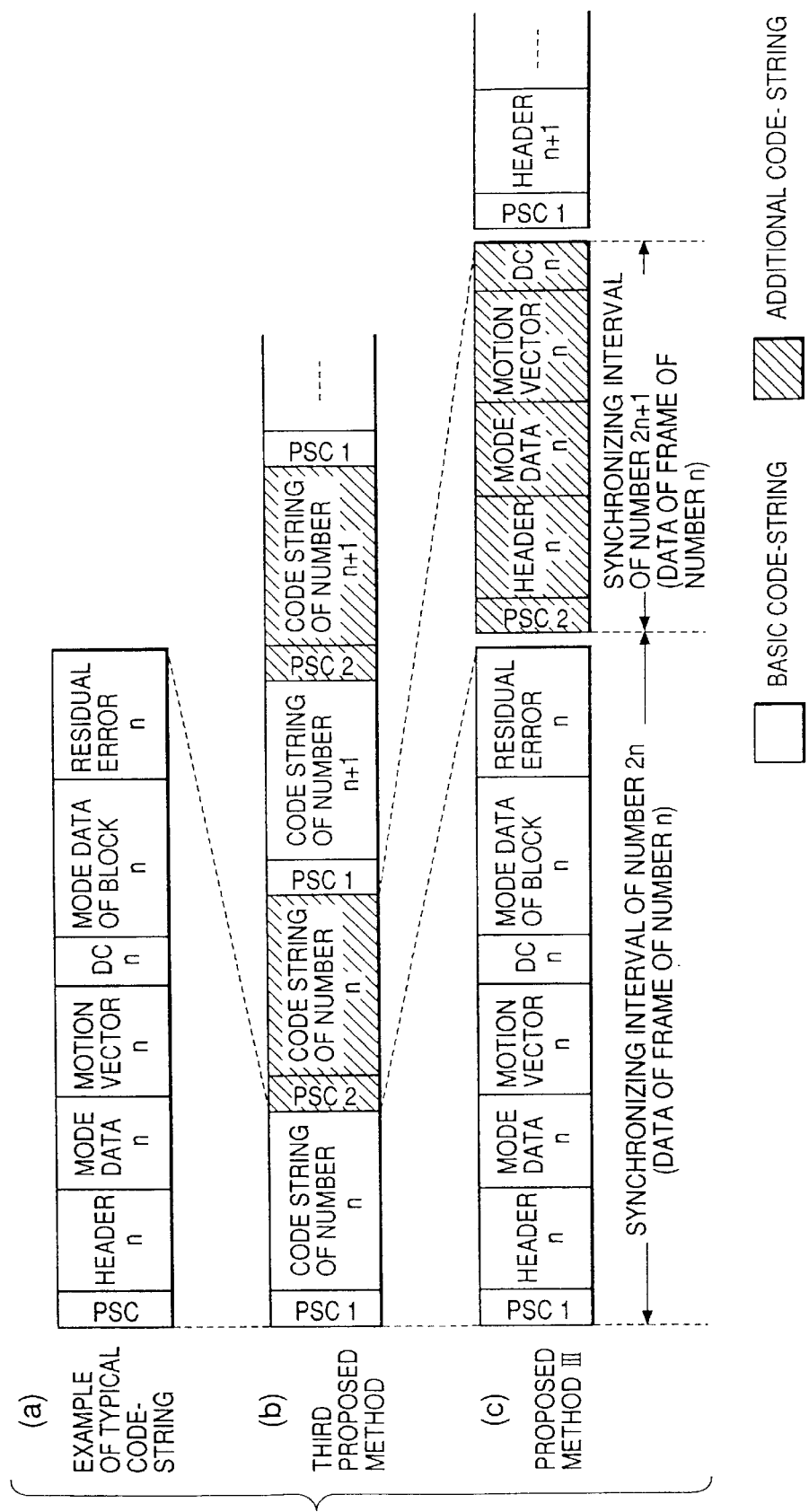
FIG. 12 is a view illustrating a construction of code strings in the third preferred embodiment.

However, if it is interpreted that the header information is also included in the synchronizing signal, it is consider that the second discriminating method performs the discrimination by a long synchronizing signal, so that the first and second discriminating methods are the same. Therefore, in FIG. 12 which illustrates the construction of code strings in this preferred embodiment, only the case using two synchronizing signals is shown. In FIG. 12, the signs n and n−1 described at the lower-right of the respective blocks indicate what number of frame the data of the block belongs to. That is, FIG. 12(b) illustrates code strings in a third proposed methods, and FIG. 12(c) illustrates code strings in proposed method II.

Figure 13:
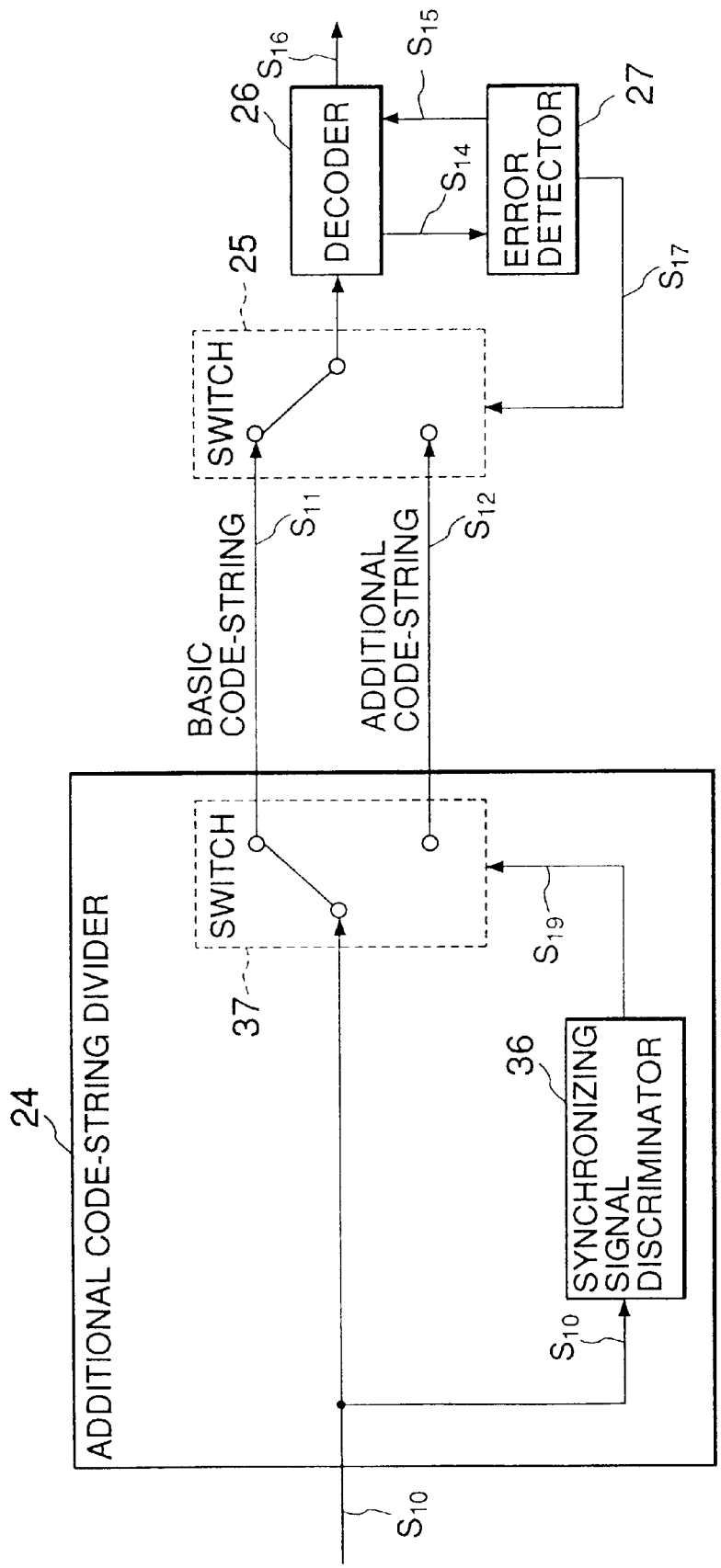
FIG. 13 is a block diagram of the third preferred embodiment of a moving-picture decoding system according to the present invention.

The third preferred embodiment of an image data decoding system according to the present invention will be described below. FIG. 13 is a block diagram of the third preferred embodiment of an image data decoding system according to the present invention, which corresponds to the image data coding system shown in FIG. 11. This system is different from the image data decoding systems in the first and second preferred embodiments shown in FIGS. 4 and 7 at the point that an additional code-string divider 24 for dividing an input code string S10 into a basic code string S11 and an additional code string S12 for outputting, includes a synchronizing signal discriminator 36 for discriminating whether the input code string S10 is the basic code string S11 or the additional code string S12, and controls a switch 37 for dividing the input code string S10 into the basic code string S11 and the additional code string S12 for outputting on the basis of the discriminated results.

Other constructions, i.e. a switch 25 for selectively inputting the basic code string S11 or the additional code string S12 to a decoder 26, the decoder 26 and an error detector 27 are the same as those of the image data decoding system in the first and second preferred embodiments.

In addition, in this preferred embodiment, it is possible to enhance the quality of a decoded image by using the correctly decoded parts of the basic code string and by replacing only parts, which have not been decoded due to error, with data obtained by decoding the additional code string, similar to the image data decoding system in the second preferred embodiment.

Moreover, in this preferred embodiment, it is possible to realize a stronger error resilience by inserting a synchronizing signal before a predictive residual signal in the basic code string.

Figure 14:
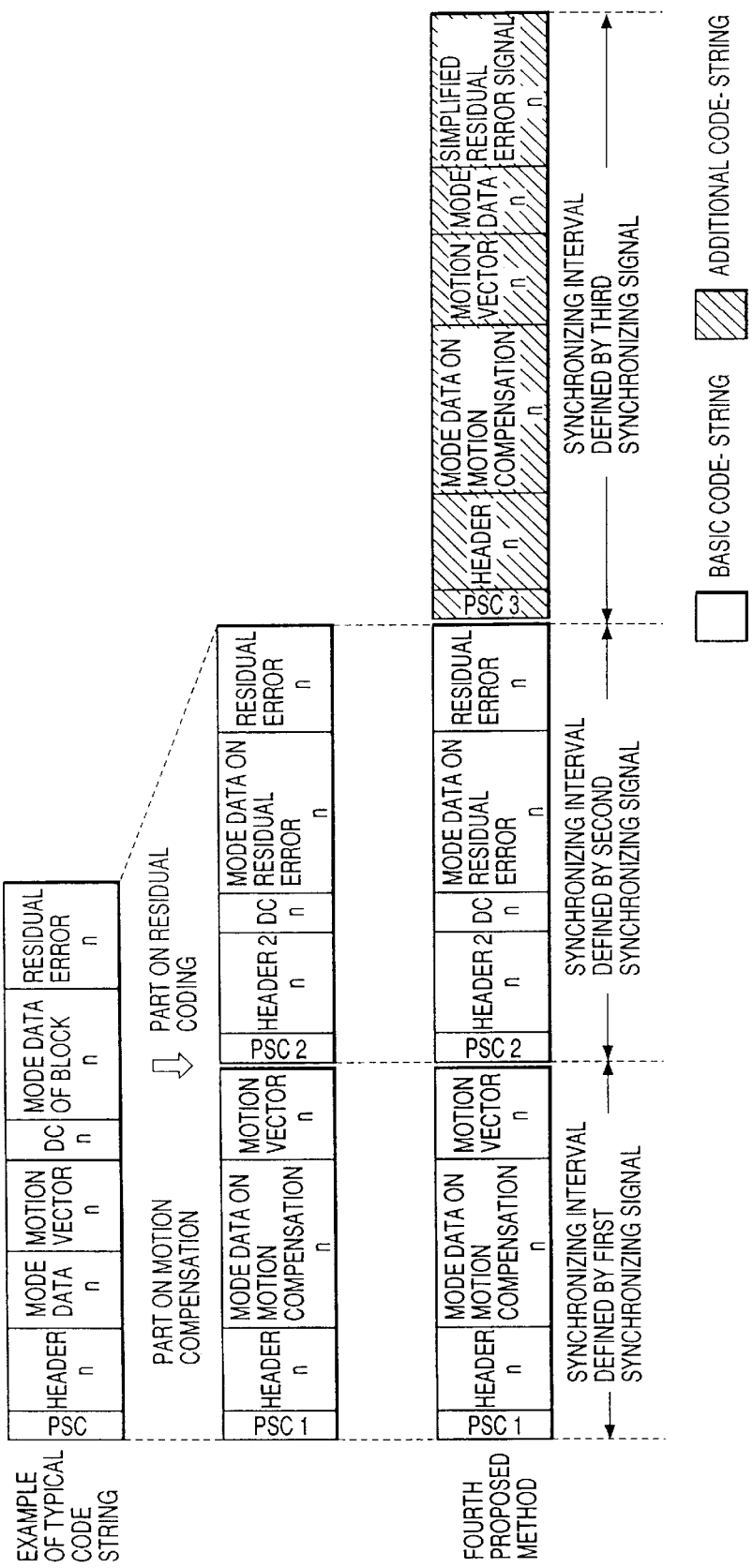
FIG. 14 is a view illustrating another construction of code strings in the third preferred embodiment.

FIG. 14 is a view illustrating the construction of code strings according to this system. In order to avoid waste of the code amount, the synchronizing interval formed by a first synchronizing signal consists of the minimum amount of data which can prepare a prediction image by the motion compensation, and a mode data, a residual signal and so forth which relate to a residual signal are incorporated into the synchronizing interval formed by the subsequent second synchronizing signal. In addition, as mentioned above, the contents corresponding to the additional code string are incorporated into the synchronizing interval formed by a third synchronizing signal.

Figure 15:
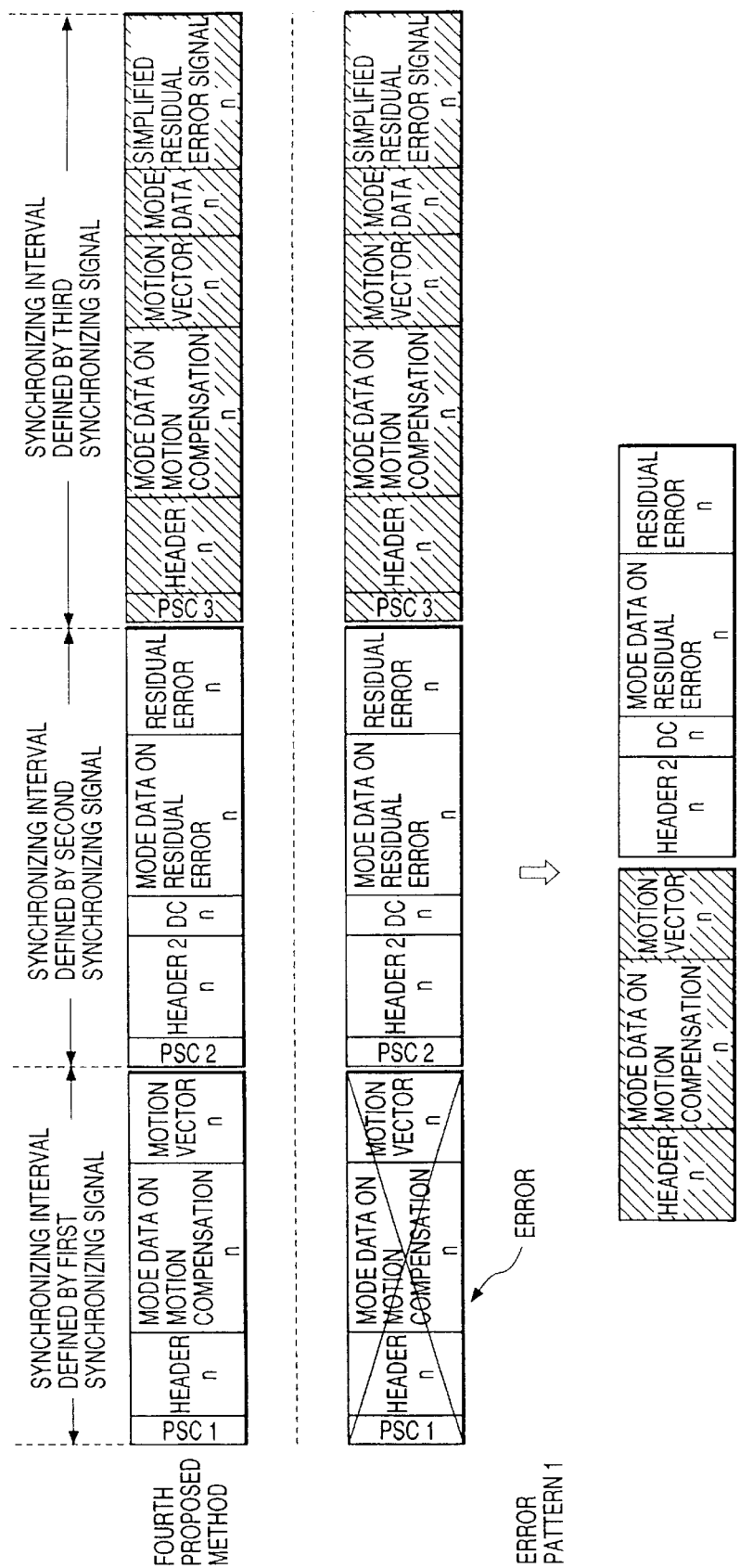
FIG. 15 is a view illustrating a decoding method when an error occurs in the third preferred embodiment.
Figure 16:
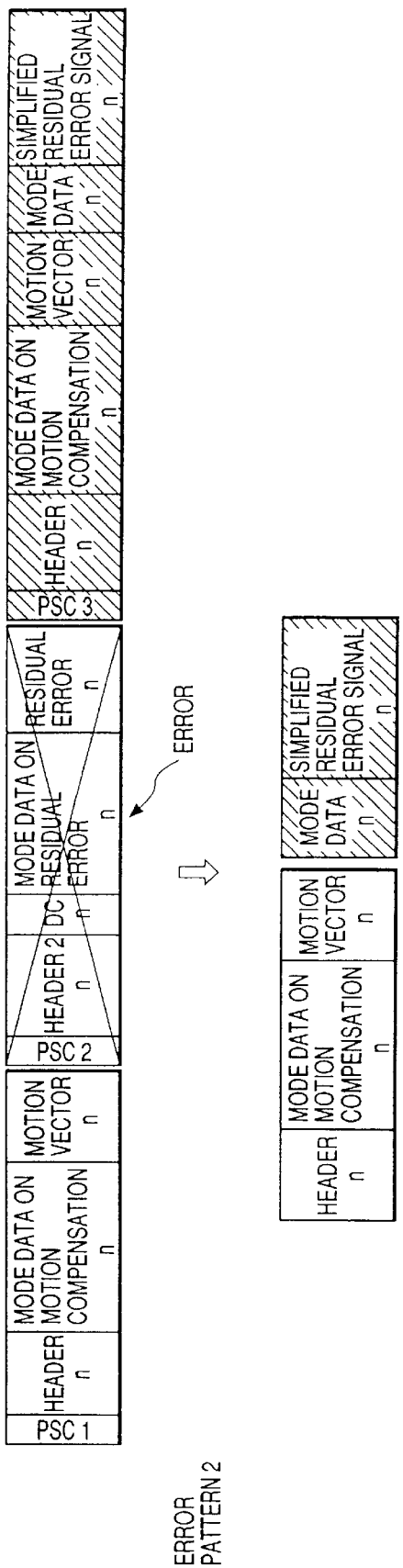
FIG. 16 is a view illustrating a decoding method when an error occurs in the third preferred embodiment.
Figure 17:
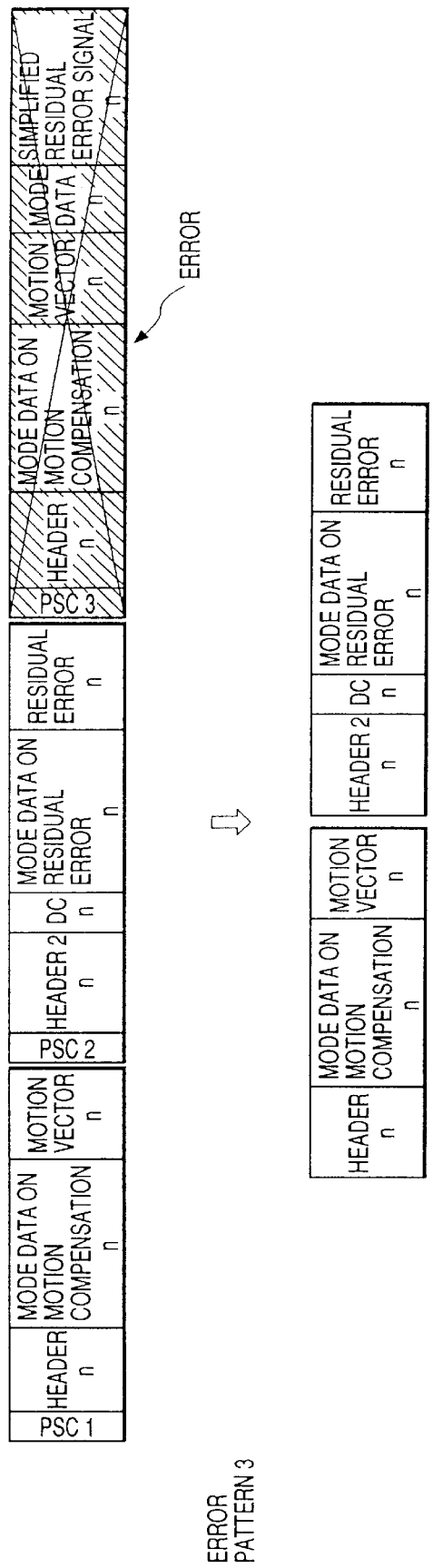
FIG. 17 is a view illustrating a decoding method when an error occurs in the third preferred embodiment.

As described in a forth proposed method in FIG. 14, when the decoding is performed, if an error occurs in the first synchronizing interval, a decoded image signal is prepared by preparing a prediction image by the additional code string in the third synchronizing interval and by adding thereto a residual signal in the second synchronizing interval. In this case, if the information relating to the preparation of the prediction signal on the basis of the additional code string is the same as that in the first synchronizing interval, it is possible to perform the completely correct decoding. In a case where an error occurs in the second synchronizing interval, a decoded image signal is prepared by preparing a prediction image on the basis of the information in the first synchronizing interval and by combining the image correctly decoded by the information in the second synchronizing interval, with the information relating to the residual signal contained in the additional code string in the third synchronizing interval. In a case where an error occurs in she third synchronizing interval, since the data in the first and second synchronizing intervals may be directly decoded, so that it is possible to perform the completely correct decoding (see FIGS. 15 through 17).

Thus, in a case where an error occurs in the basic code string, the method for simply switching the basic code string to the additional code string is not used, and the decoding is performed by using the parts which have been correctly decoded in the basic code and by adding thereto the contents of the additional code string, so that it is possible to practically use the maximum amount of data which have been decoded.

As a forth preferred embodiment, an embodiment of a code-string simplifier 28 described in the second preferred embodiment will be described below.

Figure 18:
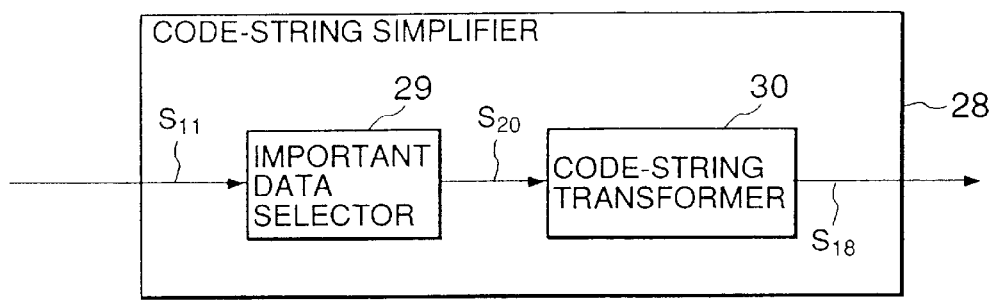
FIG. 18 is a block diagram of the fourth preferred embodiment of a code-string simplifier according to the present invention.

FIG. 18 is a block diagram of this code-string simplifier. In this preferred embodiment, an input code string S11 inputted from an encoder (not shown) includes a DCT coefficient and a motion vector data which have been quantized before being variable-length coded by variable-length encoders 7 and 9 in the moving-picture coding system shown in FIG. 1 for example. This input code string S11 is inputted to an important data selector 29 wherein only relatively important data S19 are selected to be inputted to a code-string transformer 30. The code-string transformer 30 transforms the input important data S20 into another code string S18 (e.g. a code string of variable-length codes) using a code table (e.g. a variable-length code table). The code table describes the relationship between coded object values and code words (e.g. variable-length code words) in a memory. In this embodiment, when the important data S20 is inputted as a coded object value, a code word corresponding thereto is outputted as the code string S18.

Figure 2:
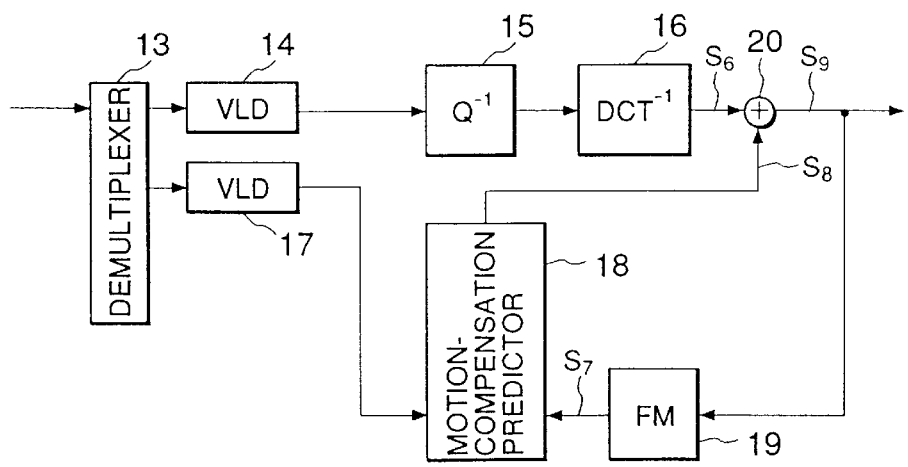
FIG. 2 is a block diagram of a conventional moving-picture decoding system.
Figure 3:
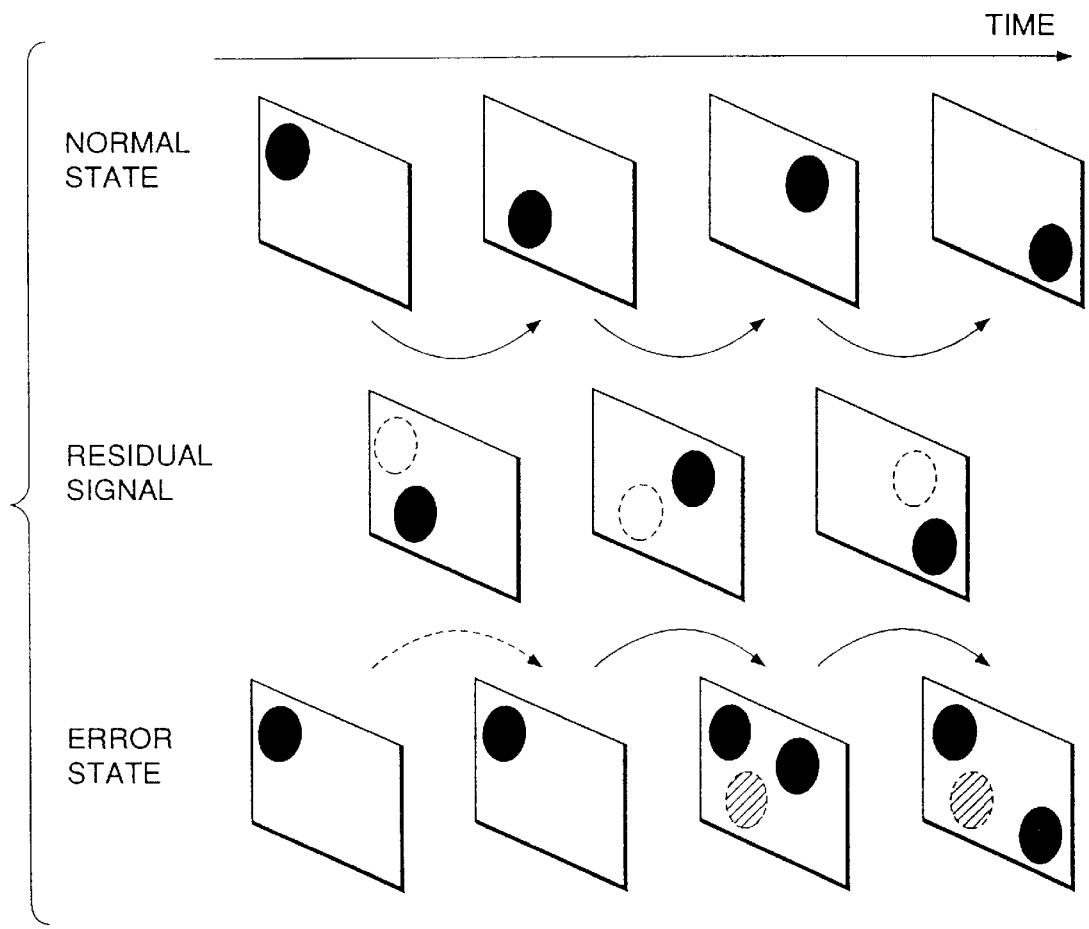
FIG. 3 is a view illustrating the influence of an error in the conventional system.

For example, when the encoder is a moving-picture coding system using the motion compensation and the predictive residual coding as shown in FIG. 1, the important data selector 29 selects, as the important data, only the header portion containing the data relating to the coding and the motion vector data since the motion vector data is more important than the quantized DCT coefficient which is the predictive residual signal. In this case, since there is no motion vector when the encoder is in the intraframe coding mode, the important data selector 29 selects no data. Therefore, in the intraframe mode, a DC component of the DCT coefficient is selected in place of the motion vector data. Thus, it is possible to select the important data in both of the interframe and intraframe modes.

Alternatively, in the important data selector 29, components near the low region of the DCT coefficient of the predictive residual signal may be selected as the important data, or the data obtained by thinning out the motion vector data may be selected as the important data, without selecting all the motion vector data. For example, the motion vectors obtained per 8 pixels×8 pixels are transformed into motion vectors per 16 pixels×16 pixels, which are selected as the important data.

The code-string transformer 30 transforms the important data S20 into a code string using a code table such as a variable-length code table as mentioned above. The code table in the code-string transformer 30, i.e. the code table for producing an additional code string, may be different from or the same as the code table for producing the basic code string. Since each of such code tables has its merits and demerits, each table may be put to its proper use in accordance with the purpose.

First, the case that the code-string transformer 30 uses an exclusive code table different from the code table for basic codes strings will be described.

When a basic code string is produced, a code table optimally prepared in view of all the data including the data other than the important data is usually used. Therefore, in a case where the code-string transformer 30 transforms only the important data into a code string, if the code table for basic code strings is directly used, there are redundant portions. Accordingly, in a case where the coding rate of a channel is regarded as important, the code-string transform of the important data S20 is carried out using a code table suitable for additional code strings in the code-string transformer 30 in addition to the code table for basic code strings. Thus, it is possible to efficiently perform the coding.

Next, the case that the code-string transformer 30 uses the same code table as the code table for basic code strings will be described.

Thus, if the code table for producing basic code strings and the code table for producing additional code strings are commonly used, since it is not required to especially prepare an additional decoder for decoding additional code strings as will be described later, it is possible to maintain the circuit size of the decoder so as to be the same as those of conventional decoders. In order to realize this, for example, the DCT coefficient of the predictive residual signal is not transmitted and only the motion vector data is selected as the important data, and when it is transmitted as an additional code string through the code-string transformer 30, a mode data indicating that there is a predictive residual signal is transformed into a mode data indicating that there is no predictive residual signal, by means of the basic code string to produce an additional code string. Thus, it is possible to produce an additional code string using the same code table as that of the basic code string.

Figure 19:
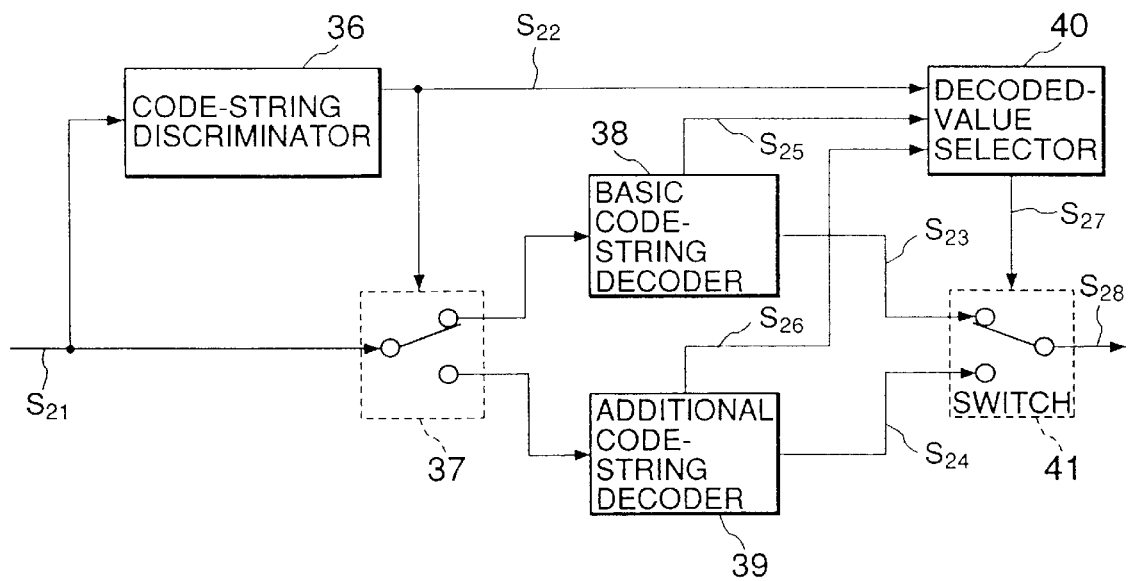
FIG. 19 is a block diagram of the fifth preferred embodiment of an image data decoding system according to the present invention.

FIG. 19 is a block diagram of the fifth preferred embodiment of an image data decoding system according to the present invention. It is discriminated in a code-string discriminator 36 whether an input code string S21 is a basic code string or an additional code string. When it is discriminated that it is an additional code string, it is discriminated whether it is an additional code string corresponding to the previously decoded basic code string. On the basis of these discriminated results, a code-string switch 37 is changed over. Thus, when the input code string S21 is a basic code string, it is inputted to a basic code-string decoder 38, and when the input code string S21 is an additional code string, the code string S21 is inputted to an additional code-string decoder 39.

The basic code-string decoder 38 and the additional code-string decoder 39 are designed to output decoded state data S25 and S6 independently of the decoded values S23 and S24, respectively. The decoded state data S25 and S26 are data indicating whether the decoding has been correctly performed. For example, the data S25 and S26 are error detection data obtained by the basic code-string decoder 38 and the additional code-string decoder 39.

A decoded value selector 40 selects a decoded value estimated to be correct, from the decoded value S23 of the basic code-string decoder 38 and the decoded value S24 of the additional code-string decoder 39, on the basis of the discriminated results S22 of the code-string discriminator 36, the decoded state data S25 of the basic code-string decoder 38, and the decoded state data S26 of the additional code-string decoder 39, and controls a decoded-value switch 41 so that the selected decoded-value is outputted as an output coding value S28. That is, the decoded-value switch 41 selectively outputs the decoded value S23 or S24 of the basic code string or the additional code string using a decoded-value switch control signal S27 outputted from the decoded value selector 40.

According to this preferred embodiment, it is possible to output a correct decoded value among the decoded values S23 and S24 outputted from the basic code-string decoder 38 and the additional code-string decoder 39, using the decoded state data S25 and S26, such as error data, outputted from the basic code-string decoder 38 and the additional code-string decoder 39. This preferred embodiment is particularly effective in an image data decoding system in the case of (1) of the fifth preferred embodiment, i.e. in a case where the basic code string and the additional code string obtained by an image data coding system are coded by different code tables.

Figure 20:
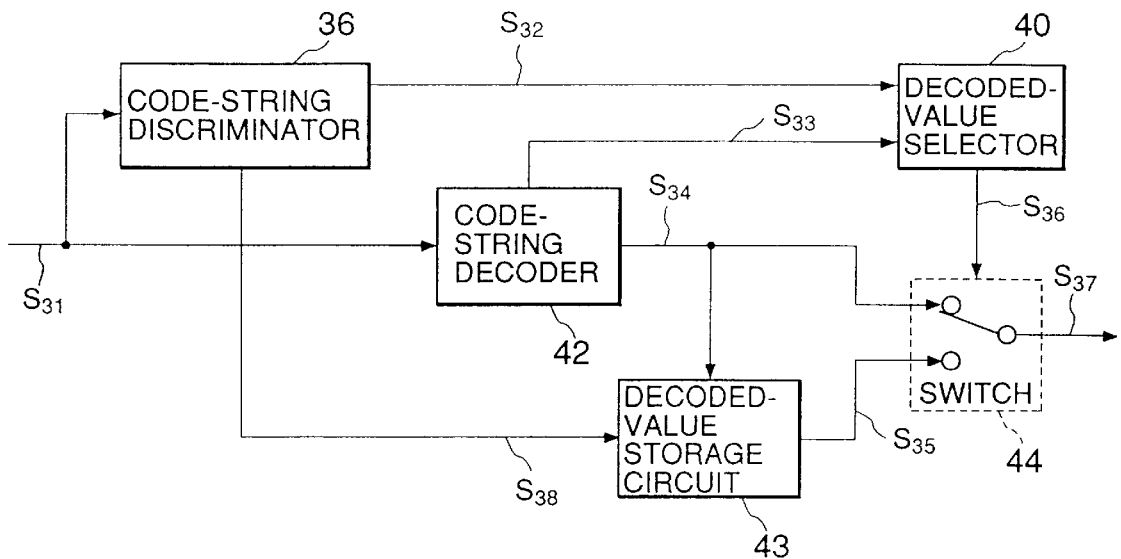
FIG. 20 is a block diagram of the sixth preferred embodiment of an image data decoding system according to the present invention.

FIG. 20 is a block diagram of the sixth preferred embodiment of an image data decoding system according to the present invention. It is discriminated in a code-string discriminator 36 whether an input code string S31 is a basic code string or an additional code string. When it is discriminated that the input code string S31 is an additional code string, it is discriminated that the input code string S31 is an additional code string corresponding to the previously decoded basic code string. In addition, the input code string S31 is decoded by a code-string decoder 42. Moreover, when it is a basic code string, a decoded value S34 is stored in a decoded-value storage 43. The code-string decoder 42 outputs a decoded state data S33 such as error data indicating whether the decoding has been correctly performed, independently of the decoded value S34.

The decoded-value selector 40 selects a decoded value estimated to be correct, from the decoded value of the basic code string and the decoded value S34 of the additional code string, on the basis of the discriminated result S32 of the code-string discriminator 36 and the decoded state data S33 outputted from the code-string decoder 42, and controls a decoded-value switch 44 so that the selected decoded-value is outputted as an output coding value S37. That is, the decoded-value switch 44 selectively outputs any one of the decoded value S35 of the basic code string outputted from the decoded-value storage 43 and the decoded value S34 of the additional code string outputted from the code-string decoder 42.

According to this preferred embodiment, it is possible to realize a decoder having substantially the same circuit scale as those of conventional systems, since the basic code string and the additional code string can be decoded by means of the same code-string decoder 42. This preferred embodiment is particularly effective in an image data decoding system in the case of (2) in the fourth preferred embodiment, i.e. in a case where the basic code string and the additional code string obtained by an image data coding system have been coded by the same code table.

As a seventh preferred embodiment of the present invention, a discriminating algorithm in the code-string discriminator 36 used in the fifth and sixth preferred embodiments will be described below.

Figure 21:
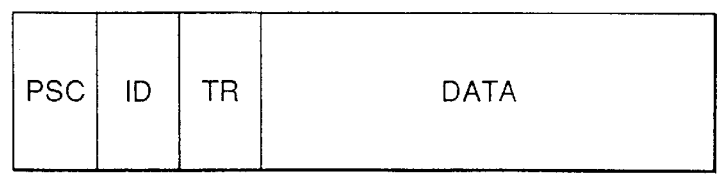
FIG. 21 is a view illustrating an example of a construction of a code string for the explanation of the seventh preferred embodiment of the present invention.

FIG. 21 illustrates an example of a basic construction of a code string. At the head of the code string, a synchronizing signal (PSC) is arranged. Subsequently, an ID for discriminating whether an input code string is a basic code string or an additional code string is arranged, and then, a data TR representative of a time position of the code string is arranged. Finally, a coded data DATA is arranged.

The code-string discriminator discriminates whether an input code string is a basic code string or an additional code string on the basis of the ID. When it is discriminated by the ID that it is an additional code string, it is also discriminated whether the code string has the same time position as that of the basic code string decoded at the last time by the TR. Thus, it is possible to discriminate the basic code string and the additional code string corresponding thereto.

Figure 22:
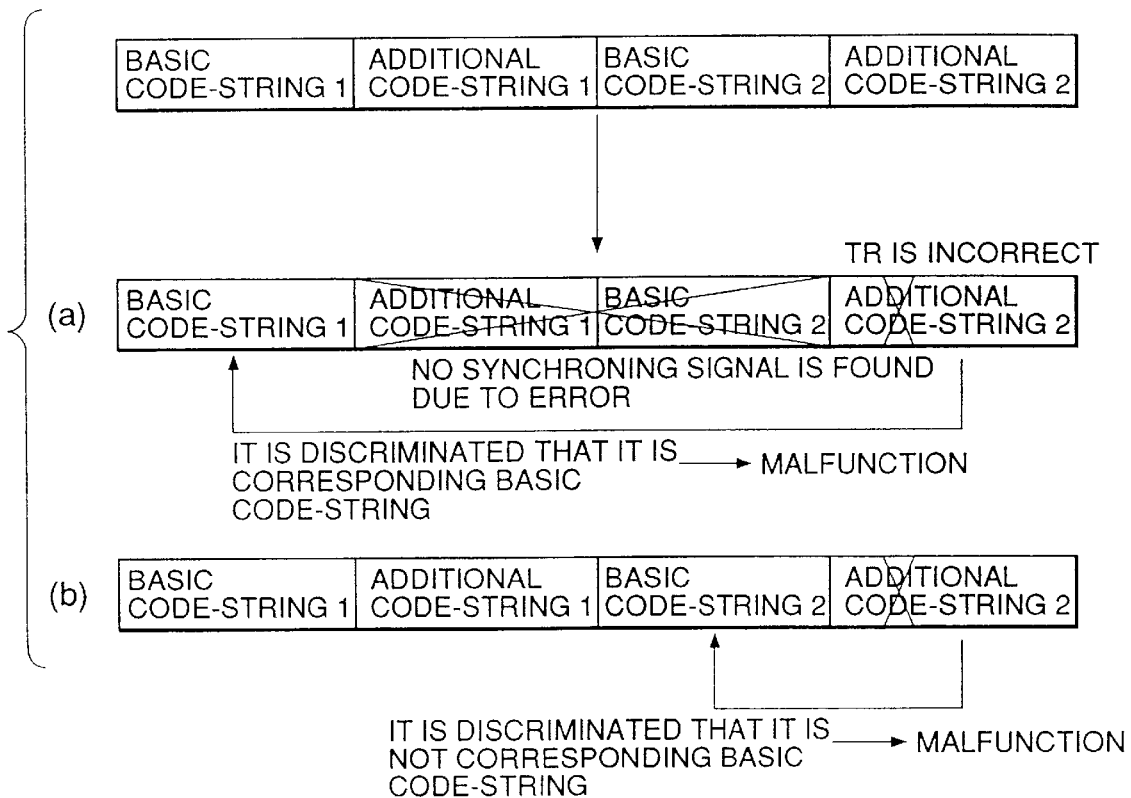
FIG. 22 is a view illustrating an example of operation when a code-string discriminator is malfunctioned for the explanation of the seventh preferred embodiment.

However, according to this method, when an error occurs in a channel, malfunction may occurs due to erroneous correspondence for the basic code string and the additional code string. For example, there will be considered the case that from the original code string expressed by the uppermost stage in FIG. 22, only basic code string 1 and additional code string 2 are decoded as shown in FIG. 22(a), and a time position data TR of the additional code string is erroneously coincide with a TR of the basic code string 1. In this case, one image must be formed by the basic code string 1 to be outputted, and thereafter, one image must be formed by only the additional code string to be outputted. However, in practice, the parts correctly decoded by the basic code string 1 and the additional code string 2 are combined to be outputted as one image.

In addition, as shown in FIG. 22(b), there will be considered the case that it is not discriminated that the basic code string 2 corresponds to the additional code string 2 due to error in the TR of the basic code string 2. In this case, although the basic code string and the additional code string must be combined to form one image, two different images are formed.

Figure 23:
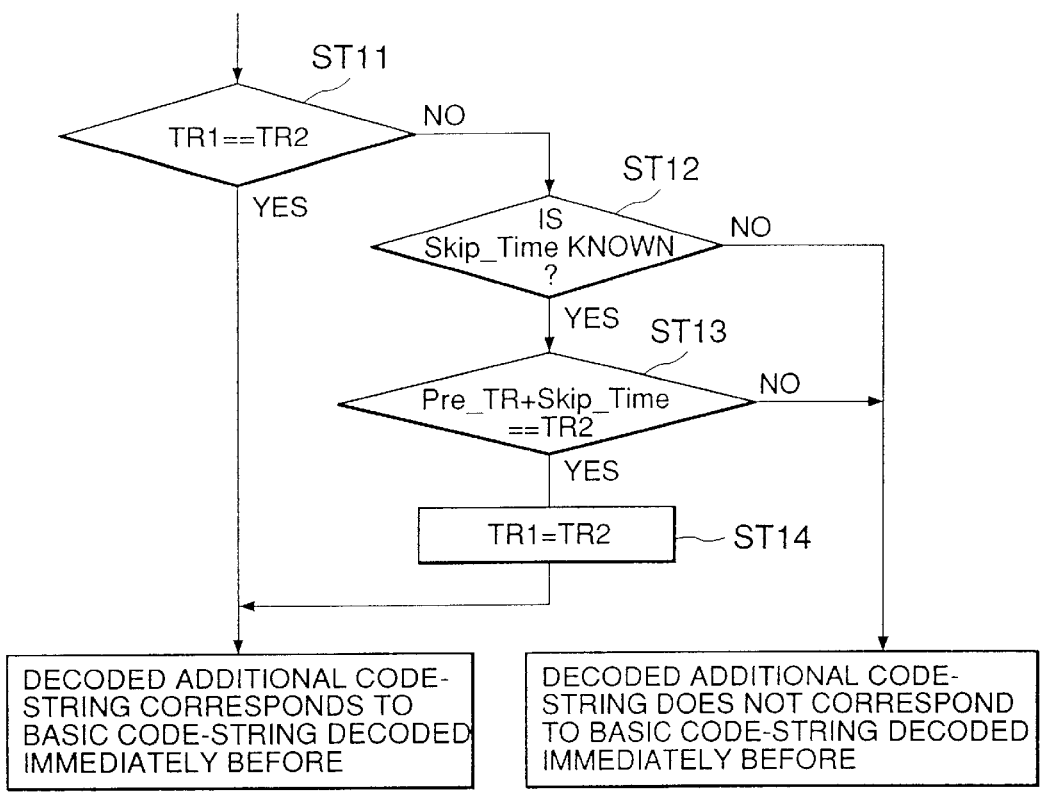
FIG. 23 is a flow chart illustrating an algorithm in a code-string discriminator in the seventh preferred embodiment.

In order to avoid such disadvantage, the relationship between the basic code string and the additional code string is discriminated, for example, in accordance with an algorithm shown in FIG. 23. It is assumed herein that the time position data TR of the basic code string is TR1, the TR of the additional code string is TR2, and the TR decoded at the last time is Pre_TR. In addition, when it has been coded by a fixed frame rate, the differential value Skip_Time between the Pre_TR and the correct TR1 and TR2 is also known.

Figure 24:
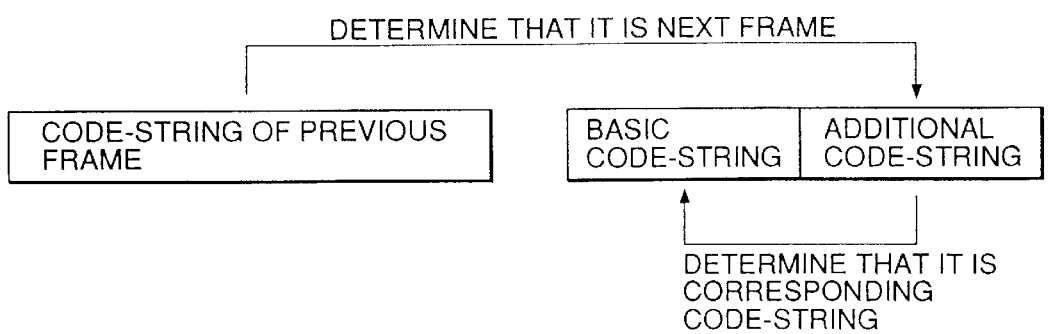
FIG. 24 is a view illustrating an example of discrimination of a basic code string corresponding to an additional code string in the seventh preferred embodiment.

In the algorithm of FIG. 23, it is first discriminated at step S11 whether TR1 is equal to TR2. When TR1 is equal to TR2, it is discriminated that the decoded additional code string corresponds to the basic code string decoded immediately before. On the other hand, when TR1 is not equal to TR2, it is discriminated at step S12 whether the differential value Skip_Time is known. When it is known, the value obtained by adding the Skip_Time to the Pre_TR is compared with TR2 at step S13. When these values are equal to each other, it is discriminated that TR1 of the basic code string therebetween is incorrect. Then, at step S14, TR1 is modified to be TR2, and it is discriminated that the decoded additional code string corresponds to the basic code string decoded immediately before. This is shown in FIG. 24.

When it is discriminated at step S12 that the Skip_Time is not known, or when it is discriminated at step S13 that the value derived by adding the Skip_Time to the Pre_TR is not equal to TR2, it is discriminated that the decoded additional code string does not corresponds to the basic code string decoded immediately before.

Figure 25:
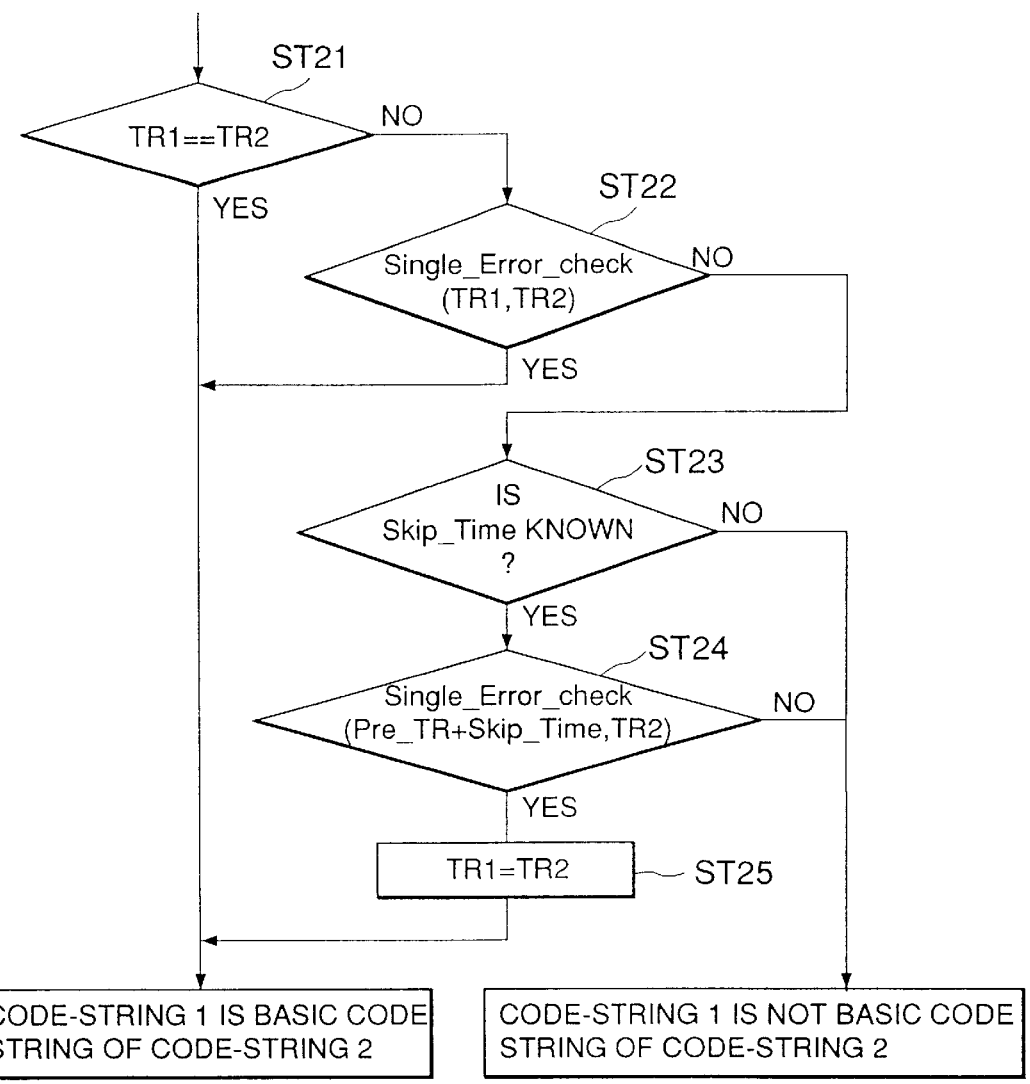
FIG. 25 is a flow chart illustrating an algorithm in a code-string discriminator in the seventh preferred embodiment, which considers an error in the code-string discriminator.

Although the algorithm of FIG. 23 can cope with the case that an error occurs in the time position data TR of the basic code string, it can not cope with other errors. Therefore, when it is required to consider error resilience so as to be able to cope with other errors, the relationship between the basic code string and the additional code string in accordance with an algorithm shown in FIG. 25 It is assumed herein that Single_Error_Check (A, B) is a function for discriminating whether the value derived by adding 1-bit error to A is equal to B.

That is, it is first discriminated at step S21 whether TR1 is equal to TR2. When TR1 is equal to TR2, it is discriminated that the code string 1 is the basic code string of the code string 2. On the other hand, when TR1 is not equal to TR2, it is discriminated at step S22 whether the value derived by adding 1-bit error to TR1 is equal to TR2. When they are equal to each other, it is discriminated that the code string 1 is the basic code string of the code string 2, and when they are not equal to each other, it is discriminated at step S23 whether the differential value Skip_Time is known. When it is known, it is discriminated at step S24 whether the value derived by adding 1-bit error to the sum of the Pre_TR and the Skip_Time is equal to TR2. When they are equal to each other, it is discriminated that TR1 of the basic code string is incorrect, and TR1 is modified to be TR2 at step S25. Then, it is discriminated that the code string 1 is the basic code string of the code string 2.

When it is discriminated at step S23 that the $Skip_{13}$ Time is not known, or when it is discriminated at step S24 that the value derived by adding 1-bit error to the sum of the Pre_TR and the Skip_Time is not equal to TR2, it is discriminated that the code string 1 is not the basic code string of the code string 2.

Figure 26:
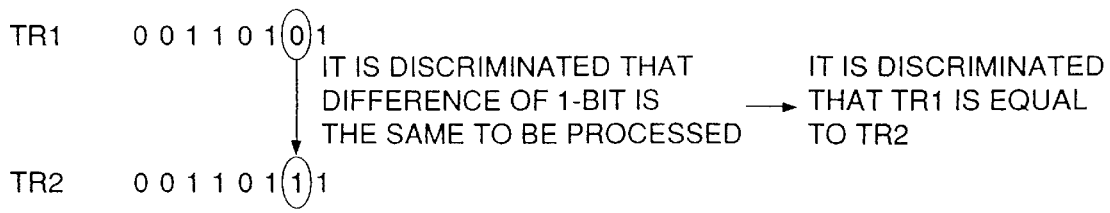
FIG. 26 is a view illustrating an example of a discriminating method in the seventh preferred embodiment, which considers an error.

In accordance with such an algorithm, it is possible to correctly discriminate even if 1-bit error is inserted into TR. This is shown in FIG. 26. Furthermore, if it is desired to discriminate a greater error than 1 bit, this function may be changed so as to correspond to the allowable error number.

Figure 27:
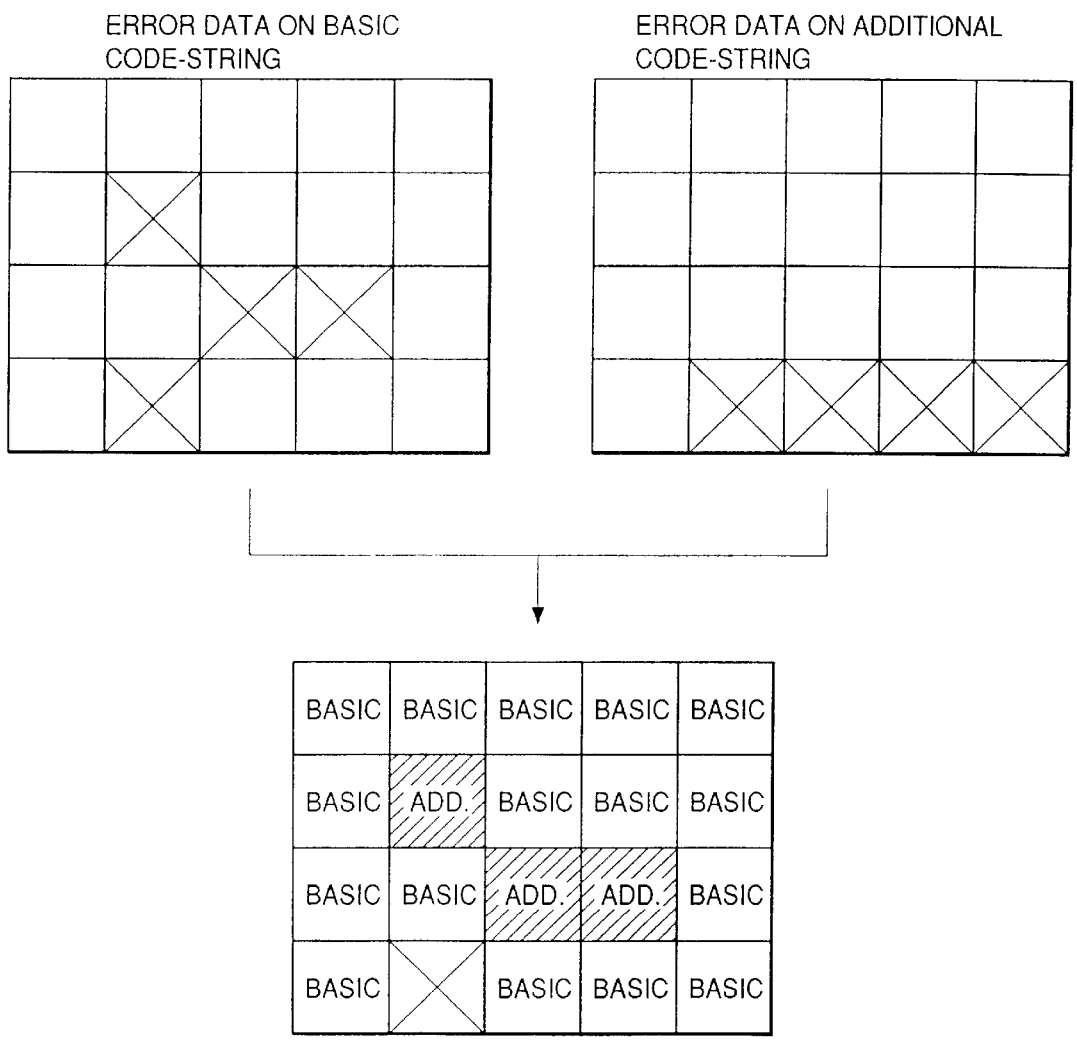
FIG. 27 is a view illustrating a decoded-value selecting method in a decoded-value selector in the eight preferred embodiment of the present invention.
Figure 28:
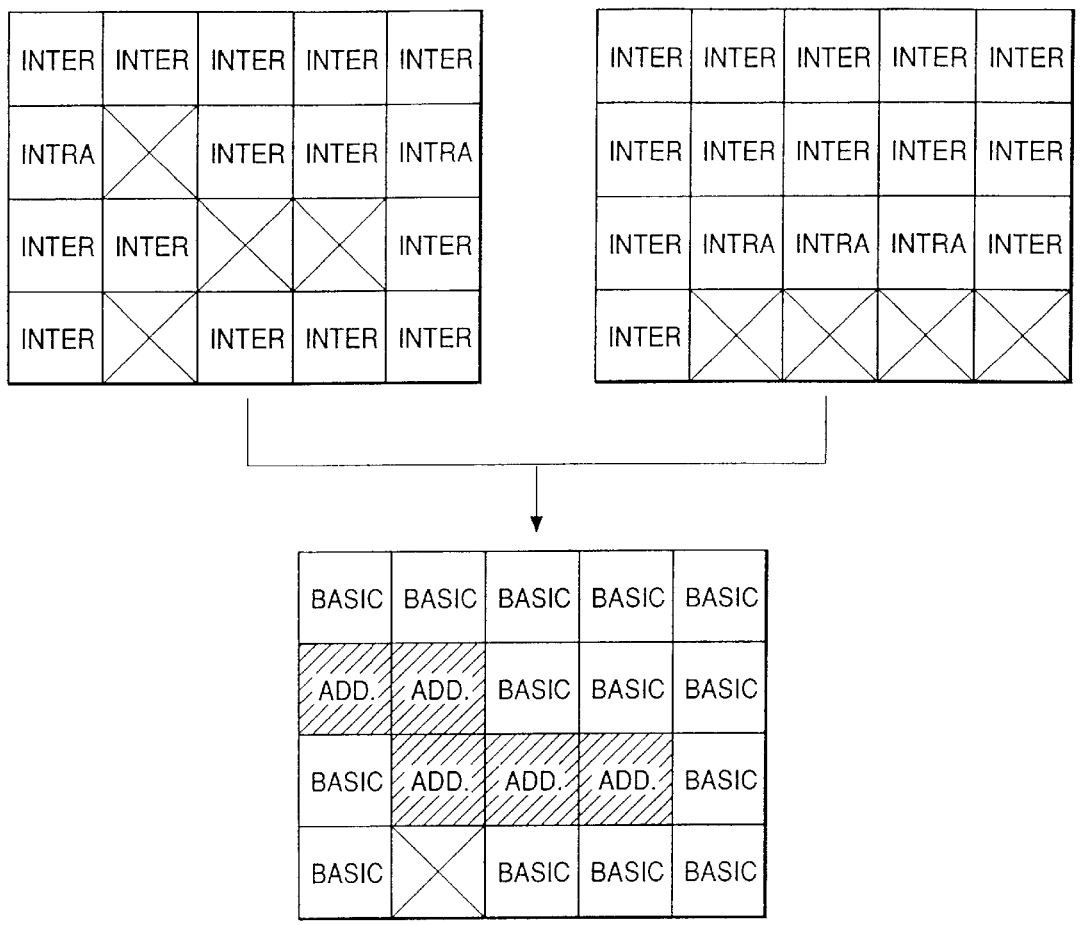
FIG. 28 is an example of a decoded-value selecting method performed in view of an error which has not found when decoding, in the eight preferred embodiment.

As an eight preferred embodiment, an embodiment of the decoded-value selector 40 used in the fifth and sixth preferred embodiments will be described below. FIGS. 27 and 28 illustrate examples of selecting methods in a decoded-value selector in this preferred embodiment.

In the decoded-value selecting method as shown in FIG. 27, error data on each of small regions of images of a basic code string and an additional code string are received from the basic code-string decoder 38 and the additional code-string decoder 39 shown in FIG. 19 or from the code-string decoder 42 shown in FIG. 20. These error data are included in the decoded-state data S25 and S26 in the case of FIG. 19 or in the decoded-state data S33 in the case of FIG. 20.

On the basis of these error data and the results discriminated by the code-string discriminator 36 shown in FIG. 19 or 20, it is determined whether the decoded value of the basic code string or the additional code string is used for each of the small regions of the image. FIG. 27 shows there is an error in the region expressed by the sign x. Since an additional code string is a code string obtained by simplifying a basic code string, the decoded value of the basic code string is usually selected in the region correctly decoded in the basic code string. In the region wherein the basic code string is incorrect and the additional code string is correctly decoded, the decoded value of the additional code string is selected. In the region wherein errors exist in both of the basic code string and the additional code string, a mode in which the last frame is directly used is selected (not coded).

Thus, when the decoded values of the basic code string and the additional code string are selectively used for each of the small regions, it is possible to decode more regions than when only the decoded value of any one of the basic code string and the additional code string is used. However, in the case of a communication state of a high error rate, regions decoded without fining out an error may exist. In such a case, decoded values is not selected for each of the regions, so that it is possible to use decoded values for each of completely decoded frames.

The decoded-value selecting method shown in FIG. 28 will be described. In the case of the decoded-value selecting method shown in FIG. 27, the error which has not been found when decoding the basic code string is directly output as an incorrect decoded value. On the other hand, in the decoded-value selecting method shown in FIG. 28, a decoded value is selected using the decoding data, in addition to the error data when the decoding is performed. The decoding data includes a mode data representative of a coding mode such as an intraframe coding and an interframe coding.

The matching of the decoding data is examined for each of the small regions of the basic code string and the additional code string. For example, when the mode data varies in a certain small region, it is determined that an error occurs in the small region. Thus, it is possible to decrease the probability of oversight of errors. In addition, if the reliability of an additional code string is enhanced using an error correcting code and so forth in the additional code string, it is possible to use a method for selecting the data on the additional code string for the small region in which the mode data varies. Moreover, for example, if an INTRA mode number is added to an additional code string, it is possible to enhance the detection accuracy of an error caused when a mode is erroneously changed to another mode.

Figure 29:
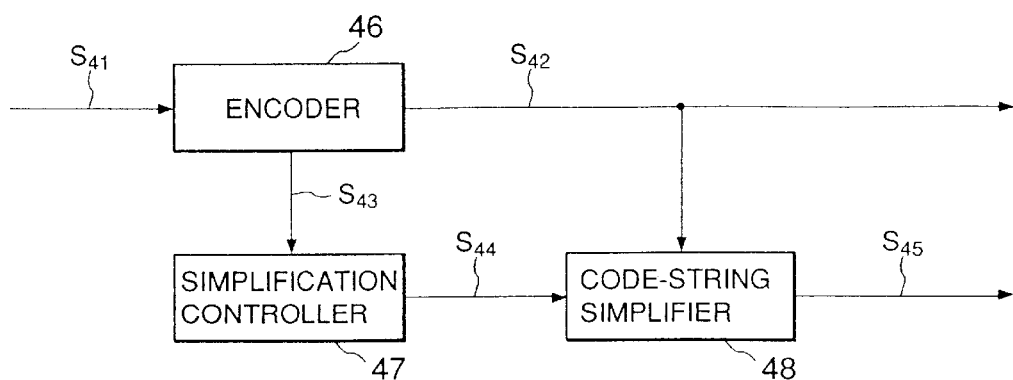
FIG. 29 is a block diagram of a simplification control section in the ninth preferred embodiment of an image data coding system according to the present invention.

FIG. 29 is a block diagram illustrating a main portion of the ninth preferred embodiment of an image data coding system according to the present invention, particularly illustrating an encoder 46, a simplification controller 47 and a code-string simplifier 48. The code-string simplifier 48 is basically the same as the code-string simplifier 28 shown in FIG. 7.

An input image signal S41 is coded by the encoder 46. On the basis of a coding data S43 outputted from the encoder 46 independently of a code string S42, the simplification controller 47 determines a simplifying method in the code-string simplifier 48 by a simplifying method control signal. In accordance with the determined simplifying method, the code-string simplifier 48 simplifies the code string S42 outputted from the encoder 46, and outputs a simplified code string S45.

The coding data S43 is data representative of, for example, (a) a code amount produced by the encoder 46, (b) the magnitude of a motion vector used for the encoder 46, (c) the number of intraframe coding regions and (d) the magnitude of a predictive residual signal. All of (b) through (d) are data on error resilience since the influence of error increases as their values increase. The simplification controller 47 controls the code-string simplifier 48 on the basis of the coding data S43, i.e. the data on the code amount of a code string and the data on the error resilience of the code string.

Specifically, in a case where there is a room in the code amount, the DCT coefficient of a predictive residual signal is also selected as the important data in addition to the motion vector. Alternatively, in a region having a great predictive residual signal, the DCT coefficient of a predictive residual signal may be selected as the important data. In addition, in a case where the DCT coefficient of a predictive residual signal is selected as the important data, it is effective means to reduce the code string by quantizing the predictive residual signal using a greater quantization width than the quantization width used for coding the basic code string in the encoder 46, without using the same predictive residual signal as that in the basic code string. Moreover, the processing for selecting more predictive residual signals of INTRA mode, which has a great influence when an error occurs, than the predictive residual signals of INTRA mode may be carried out. In addition, in a case where there is no room in the code string, it may switch whether the produced additional code string is outputted.

According to the ninth preferred embodiment, it is possible to adjust the produced code amount by simplifying the frame unit and so forth in accordance with the state of the coding, or to protect intensively only a part wherein a great error may be caused.

As mentioned above, while the preferred embodiments of the present invention have been described, the present invention should not be limited to the method for combining a basic code string and an additional code string as described in the preferred embodiments, but it may be applied to various combining methods. In addition, while the preferred embodiments have been applied to a moving-picture coding, the present invention should not be limited to the moving-picture coding, but it may be applied to a still-picture coding. Moreover, the present invention should not be limited to an image coding, but it may be applied to other codings such as an audio coding.

Figure 30:
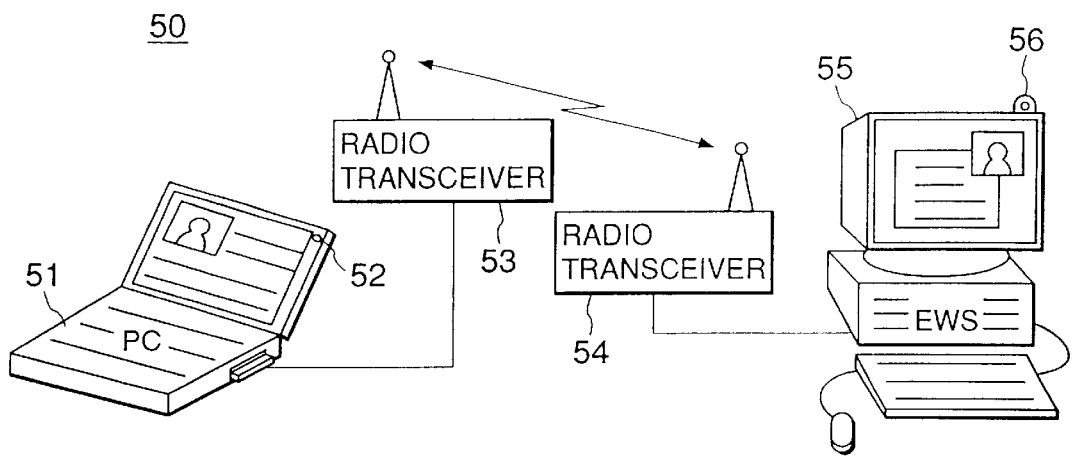
FIG. 30 is a block diagram of an example of a system to which the present invention is applied.

Referring to FIG. 30, as an example to which the present invention is applied, the preferred embodiment of a moving-picture transmission system 50 to which an image data coding and/or decoding system of the present invention is applied, will be described below.

A moving picture signal inputted from a camera 52 provided on a personal computer (PC) 51 is coded by an image data coding system build in the PC 51. After a coded data outputted from this image data coding system is multiplexed with other audio and data information, it is transmitted via a radio communication by means of a radio transmitter-receiver 53, and received by another radio transmitter-receiver 54. The signal received by the radio transmitter-receiver 54 is divided into coded data of the moving picture signal and information on audio and data. Among them, the coded data on the moving picture signal is decoded by an image data decoding system built in a workstation (EWS) 55, and displayed on the EWS 55.

On the other hand, a moving picture signal inputted from a camera 56 provided on the EWS 55 is coded using an image data coding system built in the EWS, in the same manner as that set forth above. Alter the coded data of the moving picture signal is multiplexed with other audio and data information, it is transmitted via a radio communication by means of the radio transmitter-receiver 54, and received by the radio transmitter-receiver 53. The signal received by the radio transmitter-receiver 53 is divided into coded data of the moving picture signal and information on audio and data. Among them, the coded data of the moving picture signal is decoded by an image data decoding system build in the PC 51, and displayed on the PC 51.

Figure 31:
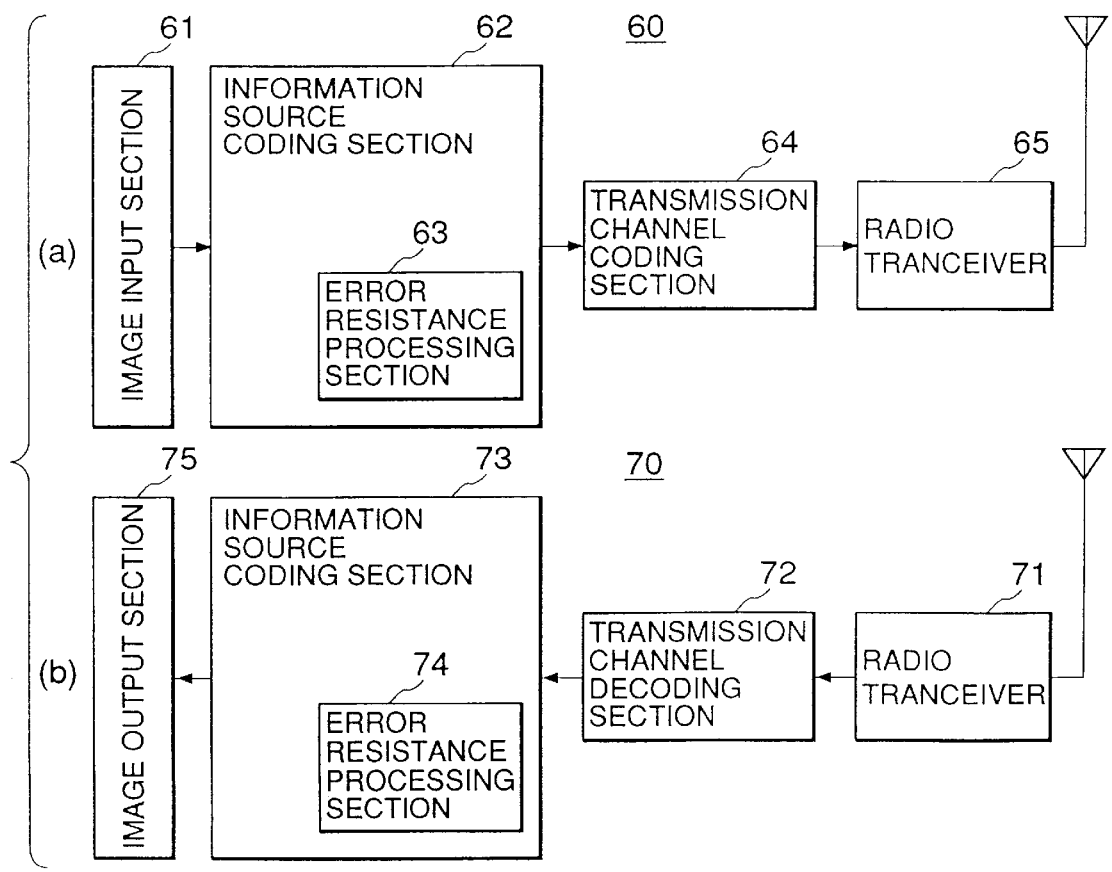
FIG. 31 is a block diagram schematically illustrating a moving-picture coding system and a moving-picture decoding system which are used in the system of FIG. 30.

FIGS. 31(a) and 31(b) are block diagrams schematically illustrating an image data coding system 60 and an image data decoding system 70 built in the PC 51 and the EWS 55 of FIG. 30, respectively.

The image data coding system shown in FIG. 31(a) includes an information source coding section 62 which receives an image signal from an image input section 61 such as a camera and which has an error resilience processing section 63, and a channel coding section 64. The information source coding section 62 performs the discrete-cosine transform (DCT) of a predictive residual signal, the quantization of the produced DCT coefficient and so forth. The channel coding section 64 performs the variable-length coding, the error detection on the coded data, the error correction coding and so forth. The coded data outputted from the channel coding section 64 is transmitted to a radio transmitter-receiver 65 for a radio communication.

On the other hand, the image data decoding system 70 shown in FIG. 31(b) includes a channel decoding section 72 for inputting the coded data received by a radio transmitter-receiver 71 to perform the inverse processing of that performed in the channel coding section 64, and an information source decoding section 73 which receives a signal outputted from the channel decoding section 72 to perform the inverse processing of that performed by the information source coding section 62 and which has an error resilience processing section 74. The image decoded by the information source decoding section 73 is outputted by an image output section 75 such as a display.

What is claimed is:

1. A computer system for realizing coding function having improved error resilience in a transmission channel, comprising:

basic code-string forming means for coding an input image signal to output a basic code string;

additional code-string forming means for forming an additional code string including at least a part of said basic code string; and code-string combining means for combining said additional code string with said basic code string so as to output a combined code string.

2. The computer system as set forth in claim 1, further comprising code-string simplifying means for simplifying said additional code string to reduce the code amount of the additional code string; and wherein said code string combining means synthesizes the additional code string simplified by the code-string simplifying means with said basic code string, for outputting the synthesized code string.

3. The computer system as set forth in claim 2, further comprising means for controlling a simplifying method performed by said code-string simplifying means, on the basis of data on the code amount of the code string outputted from said basic code-string forming means and on the basis of data on error resilience of the code string.

4. The computer system as set forth in claim 2, further comprising synchronizing signal adding means for adding a synchronizing signal to said additional code string; wherein said code-string combining means synthesizes the additional code string to which the synchronizing signal is added by the synchronizing signal adding means, with said basic code string for outputting the synthesized code string.

5. The computer system as set forth in claim 2, wherein said basic code-string forming means codes said input image signal using a predetermined code table to produce said basic code string; and wherein said code-string simplifying means comprises important data selecting means for selecting only an important data of a relatively high importance among said basic code string, and code-string transforming means for transforming the code string of the important data selected by the important data selecting means, using a code table which is optimized to the important data and which is different from the code table of said basic code-string forming means.

6. The computer system as set forth in claim 5, further comprising means for controlling a simplifying method performed by said code-string simplifying means, on the basis of data on the code amount of the code string outputted from said basic code-string forming means and on the basis of data on error resilience of the code string.

7. The computer system as set forth in claim 2, wherein said basic code-string forming means codes said input image signal using a predetermined code table to produce said basic code string, and wherein said code-string simplifying means comprises important data selecting means for selecting only an important data of a relatively high importance among said basic code string, and code-string transforming means for transforming the code string of the important data selected by the important data selecting means, using the same code table as that of said basic code-string forming means.

8. The computer system as set forth in claim 7, further comprising means for controlling a simplifying method performed by said code-string simplifying means, on the basis of data on the code amount of the code string outputted from said basic code-string forming means and on the basis of data on error resilience of the code string.

9. A computer system for realizing a coding function having improved error resilience in a transmission channel, comprising:

an encoder to encode an input image signal into a basic code string;

a code-string circuit to form an additional code string including at least a part of said basic code string; and a synthesizer to combine said additional code string with said basic code string into a combined code string.

10. The computer system as set forth in claim 9, further comprising a code-string simplifier to reduce the code amount of the additional code string;

wherein said synthesizer synthesizes the additional code string simplified by the code-string simplifier with said basic code string into a synthesized code string.

11. The computer system as set forth in claim 10, further comprising a simplification controller to control a simplifying method performed by said code-string simplifier, on the basis of data on the code amount of the code string outputted from said encoder and on the basis of data on error resilience of the code string.

12. The computer system as set forth in claim 10, further comprising a synchronizing signal adder to add a synchronizing signal to said additional code string;

wherein said synthesizer synthesizes the additional code string with the synchronizing signal and said basic code string into the synthesized code string.

13. The computer system as set forth in claim 10, wherein said encoder encodes said input image signal using a predetermined code table to produce said basic code string; and wherein said code-string simplifier comprises a data selector to select data of a relatively high importance among said basic code string, and a code-string transformer to transform the code string of the important data selected by the data selector, using a code table which is optimized to the important data and which is different from the code table of said encoder.

14. The computer system as set forth in claim 13, further comprising a simplification controller to control a simplifying method performed by said code-string simplifier, on the basis of data on the code amount of the code string outputted from said encoder and on the basis of data on error resilience of the code string.

15. The computer system as set forth in claim 10, wherein said encoder encodes said input image signal using a predetermined code table to produce said basic code string, and wherein said code-string simplifier comprises a data selector to select data of a relatively high importance among said basic code string, and a code-string transformer to transform the code string of the important data selected by the data selector, using the same code table as that of said encoder.

16. The computer system as set forth in claim 15, further comprising a simplification controller to control a simplifying method performed by said code-string simplifier, on the basis of data on the code amount of the code string outputted from said encoder and on the basis of data on error resilience of the code string.

* * * * *